US011636220B2

(12) United States Patent
Swenson et al.

(10) Patent No.: US 11,636,220 B2
(45) Date of Patent: Apr. 25, 2023

(54) DATA MANAGEMENT SYSTEMS AND METHODS

(71) Applicant: Intertrust Technologies Corporation, Sunnyvale, CA (US)

(72) Inventors: Eric Swenson, Soquel, CA (US); Harbinder Singh Hayer, Menlo Park, CA (US)

(73) Assignee: Intertrust Technologies Corporation, Sunnyvale, CA (US)

(*) Notice: Subject to any disclaimer, the term of this patent is extended or adjusted under 35 U.S.C. 154(b) by 392 days.

(21) Appl. No.: 16/778,934

(22) Filed: Jan. 31, 2020

(65) Prior Publication Data

US 2020/0250328 A1 Aug. 6, 2020

Related U.S. Application Data

(60) Provisional application No. 62/800,103, filed on Feb. 1, 2019.

(51) Int. Cl.
*G06F 21/62* (2013.01)
*H04L 9/40* (2022.01)
*G06F 16/2455* (2019.01)

(52) U.S. Cl.
CPC ...... *G06F 21/6218* (2013.01); *G06F 16/2455* (2019.01); *H04L 63/0853* (2013.01)

(58) Field of Classification Search
CPC ......... G06F 21/6218; G06F 2221/2141; H04L 63/102; H04L 63/0853
USPC ............................................................ 726/1
See application file for complete search history.

(56) References Cited

U.S. PATENT DOCUMENTS

| 5,941,947 A | * | 8/1999 | Brown ................ G06F 21/6218 709/225 |
| 6,038,563 A | | 3/2000 | Bapat et al. |
| 6,158,010 A | | 12/2000 | Moriconi et al. |

(Continued)

FOREIGN PATENT DOCUMENTS

| JP | 2009181598 A | * | 8/2009 | ......... H04L 63/0442 |
| JP | 2012239048 A | * | 12/2012 | |

OTHER PUBLICATIONS

Oracle® Database, Net Services Reference, 12c Release 1 (12.1), E17611-13, Dec. 2014, 232 pages. (Year: 2014).*

(Continued)

*Primary Examiner* — Luu T Pham
*Assistant Examiner* — Walter J Malinowski
(74) *Attorney, Agent, or Firm* — John P. Davis; Thayne and Davis LLC

(57) ABSTRACT

This disclosure relates to systems and methods for managing access to data through enforcement of one or more associated rules. In various embodiments, a directory may be used to manage and/or otherwise record various relationships between objects, that may include governed objects such as data sets, and associated rules and rule sets. Access requests involving governed objects may be compared with relevant rules to determine whether the requested access should be allowed and what, if any, restrictions should be applied in connection with such access. Various embodiments of the disclosed systems and methods may allow for a data governance model that is flexible, allows for use across multiple complex organizations, and is highly extensible.

17 Claims, 24 Drawing Sheets

(56) References Cited

U.S. PATENT DOCUMENTS

| | | | | |
|---|---|---|---|---|
| 6,363,393 | B1* | 3/2002 | Ribitzky | G16Z 99/00 |
| | | | | 707/999.102 |
| 6,487,552 | B1* | 11/2002 | Lei | G06F 21/6227 |
| | | | | 707/999.005 |
| 6,715,080 | B1* | 3/2004 | Starkovich | H04L 67/34 |
| | | | | 709/228 |
| 6,889,210 | B1 | 5/2005 | Vainstein | |
| 6,931,530 | B2 | 8/2005 | Pham et al. | |
| 7,315,903 | B1* | 1/2008 | Bowden | H04L 43/0876 |
| | | | | 709/251 |
| 7,467,142 | B2 | 12/2008 | Sinn et al. | |
| 7,716,240 | B2 | 5/2010 | Lim | |
| 7,895,445 | B1* | 2/2011 | Albanese | G06F 21/6218 |
| | | | | 713/172 |
| 8,490,163 | B1* | 7/2013 | Harsell | G06F 21/6236 |
| | | | | 726/6 |
| 8,640,188 | B2 | 1/2014 | Riley et al. | |
| 8,996,482 | B1* | 3/2015 | Singh | G06F 16/27 |
| | | | | 707/698 |
| 9,118,617 | B1* | 8/2015 | Giroux | H04L 63/105 |
| 9,805,209 | B2 | 10/2017 | Naglost et al. | |
| 10,380,568 | B1* | 8/2019 | Rogers | G06Q 20/1235 |
| 10,614,466 | B2* | 4/2020 | Palermo | G06Q 30/06 |
| 10,831,883 | B1* | 11/2020 | Pawar | G06F 21/554 |
| 10,878,079 | B2* | 12/2020 | Vepa | G06F 21/335 |
| 10,983,963 | B1* | 4/2021 | Venkatasubramanian | |
| | | | | G06F 16/254 |
| 2002/0010679 | A1* | 1/2002 | Felsher | G06F 21/6245 |
| | | | | 705/51 |
| 2003/0154401 | A1* | 8/2003 | Hartman | H04L 63/20 |
| | | | | 726/30 |
| 2004/0255137 | A1* | 12/2004 | Ying | H04L 63/0884 |
| | | | | 713/193 |
| 2005/0004831 | A1* | 1/2005 | Najmi | G06Q 10/087 |
| | | | | 705/7.22 |
| 2005/0108563 | A1* | 5/2005 | Becker | H04N 21/25808 |
| | | | | 348/E7.056 |
| 2005/0210212 | A1* | 9/2005 | Nagasoe | G06F 21/80 |
| | | | | 714/E11.12 |
| 2006/0149408 | A1* | 7/2006 | Speeter | G06F 8/71 |
| | | | | 700/126 |
| 2006/0168584 | A1* | 7/2006 | Dawson | G06F 11/3495 |
| | | | | 714/E11.202 |
| 2006/0248069 | A1* | 11/2006 | Qing | H04L 67/34 |
| 2007/0055658 | A1* | 3/2007 | Hsiao | G06F 16/24534 |
| 2007/0100768 | A1* | 5/2007 | Boccon-Gibod | H04L 9/3242 |
| | | | | 705/59 |
| 2007/0168461 | A1* | 7/2007 | Moore | H04L 67/02 |
| | | | | 709/217 |
| 2007/0204078 | A1* | 8/2007 | Boccon-Gibod | G06F 21/10 |
| | | | | 710/54 |
| 2007/0256124 | A1* | 11/2007 | Ih | G06F 21/36 |
| | | | | 726/9 |
| 2009/0007021 | A1* | 1/2009 | Hayton | G06F 21/604 |
| | | | | 715/843 |
| 2009/0125712 | A1* | 5/2009 | Janes | H04L 9/0891 |
| | | | | 713/151 |
| 2009/0249060 | A1* | 10/2009 | Dossett | H04L 9/0822 |
| | | | | 713/156 |
| 2009/0328167 | A1* | 12/2009 | O'Mahony | H04L 63/08 |
| | | | | 713/185 |
| 2010/0064354 | A1* | 3/2010 | Irvine | H04L 63/08 |
| | | | | 726/28 |
| 2011/0313930 | A1* | 12/2011 | Bailey, Jr. | G06Q 20/382 |
| | | | | 705/64 |
| 2012/0017263 | A1* | 1/2012 | Dillaway | G06F 21/6218 |
| | | | | 726/1 |
| 2012/0117638 | A1* | 5/2012 | Radier | H04L 63/10 |
| | | | | 726/9 |
| 2013/0096943 | A1* | 4/2013 | Carey | G06F 21/6263 |
| | | | | 705/2 |
| 2013/0117313 | A1* | 5/2013 | Miao | G16H 40/20 |
| | | | | 707/E17.005 |
| 2013/0232474 | A1* | 9/2013 | Leclair | G06F 11/3668 |
| | | | | 717/134 |
| 2014/0096199 | A1* | 4/2014 | Dave | H04L 63/0884 |
| | | | | 726/4 |
| 2014/0325587 | A1* | 10/2014 | Nilsson | G06F 21/6245 |
| | | | | 726/1 |
| 2015/0220659 | A1* | 8/2015 | Rissanen | G06F 21/6218 |
| | | | | 707/759 |
| 2015/0227749 | A1* | 8/2015 | Schincariol | H04L 67/1097 |
| | | | | 726/28 |
| 2015/0302421 | A1* | 10/2015 | Caton | G06F 21/34 |
| | | | | 705/17 |
| 2016/0034305 | A1* | 2/2016 | Shear | H04L 47/70 |
| | | | | 707/722 |
| 2016/0254904 | A1* | 9/2016 | Hjelm | H04L 9/006 |
| | | | | 713/155 |
| 2016/0337964 | A1* | 11/2016 | Mochizuki | H04W 48/08 |
| 2016/0352751 | A1* | 12/2016 | Perrufel | H04L 63/123 |
| 2017/0060924 | A1* | 3/2017 | Fitzhardinge | H04L 67/1095 |
| 2017/0093878 | A1* | 3/2017 | Rodniansky | G06F 21/85 |
| 2017/0099320 | A1* | 4/2017 | Ratier | G06Q 20/3227 |
| 2017/0352245 | A1* | 12/2017 | Maher | H04L 63/1425 |
| 2018/0033009 | A1* | 2/2018 | Goldman | G06Q 40/10 |
| 2018/0039658 | A1* | 2/2018 | Carey | G06F 16/219 |
| 2018/0060365 | A1* | 3/2018 | Mujumdar | G06F 21/6227 |
| 2018/0115554 | A1* | 4/2018 | Dyon | H04L 63/164 |
| 2018/0137297 | A1* | 5/2018 | Drias | H04L 9/0894 |
| 2018/0137401 | A1* | 5/2018 | Kumar | G06F 40/30 |
| 2018/0183897 | A1* | 6/2018 | Singhal | H04W 4/50 |
| 2018/0189517 | A1 | 7/2018 | Larson et al. | |
| 2018/0367663 | A1* | 12/2018 | Nagao | H04W 8/183 |
| 2019/0327271 | A1* | 10/2019 | Saxena | H04L 63/104 |
| 2019/0335003 | A1* | 10/2019 | Wade | H04L 67/303 |
| 2020/0099515 | A1* | 3/2020 | Hopkins | G06F 21/6209 |
| 2020/0228500 | A1* | 7/2020 | Olumofin | G06F 40/30 |
| 2020/0327252 | A1* | 10/2020 | McFall | G06F 21/78 |
| 2022/0052993 | A1* | 2/2022 | Zhuravlev | G06F 21/6218 |

OTHER PUBLICATIONS

Pernici, Barbara. "Objects with roles." In Proceedings of the ACM SIGOIS and IEEE CS TC-OA conference on Office information systems, pp. 205-215. 1990. (Year: 1990).*

Majetic, Ivo, and Ernst L. Leiss. "Authorization and revocation in object-oriented databases." IEEE transactions on knowledge and data engineering 9, No. 4 (1997): 668-672. (Year: 1997).*

Karjoth, Günter. "The authorization service of tivoli policy director." In Seventeenth Annual Computer Security Applications Conference, pp. 319-328. IEEE, 2001. (Year: 2001).*

Ryutov, Tatyana, Clifford Neuman, Kim Dongho, and Zhou Li. "Integrated access control and intrusion detection for web servers." IEEE transactions on parallel and distributed systems 14, No. 9 (2003): 841-850. (Year: 2003).*

NPL—Scheffler—Privacy Enforcement with Data Owner Defined Policies. Published Sep. 2, 2013.

NPL—Rajasekar et al.—A Prototype Rule-Based Distributed Data Management System. Published Jan. 2006.

* cited by examiner

Rule Set 1 - 2202

| Subject | Privilege | Object | Allow/Deny | Restr. | RC | Depth |
|---|---|---|---|---|---|---|
| User 2 (Account) | View | Sales (Organization) | Deny | - | - | 0 |
| User 2 (Account) | Modify | Sales (Organization) | Deny | - | - | 0 |

Rule Set 2 - 2204

| Subject | Privilege | Object | Allow/Deny | Restr. | RC | Depth |
|---|---|---|---|---|---|---|
| User 2 (Account) | View | Sales (Organization) | Allow | - | - | 0 |
| User 2 (Account) | Modify | Sales (Organization) | Allow | - | - | 0 |

Tree structure:
- Root
  - AAA Data (Organization)
  - ACME (Organization)
    - Marketing (Organization)
    - Rule Set 3 (Rule Set)
    - Sales (Organization)
      - Rule Set 1 (Rule Set) (Priority 0)
      - Rule Set 2 (Rule Set) (Priority 1)
      - User 1 (Account)
  - User 2 (Account)

*Rule Set 1 - 2302*

| Subject | Privilege | Object | Allow/Deny | Restr. | RC | Depth |
|---|---|---|---|---|---|---|
| User 2 (Account) | View | Sales (Organization) | Deny | - | - | 0 |
| User 2 (Account) | Modify | Sales (Organization) | Deny | - | - | 0 |

*Rule Set 2 - 2304*

| Subject | Privilege | Object | Allow/Deny | Restr. | RC | Depth |
|---|---|---|---|---|---|---|
| User 2 (Account) | View | Sales (Organization) | Allow | - | - | 0 |
| User 2 (Account) | Modify | Sales (Organization) | Allow | - | - | 0 |

*Rule Set 3 - 2306*

| Subject | Privilege | Object | Allow/Deny | Restr. | RC | Depth |
|---|---|---|---|---|---|---|
| User 2 (Account) | View | Sales (Organization) | Allow | - | - | 0 |

DATA MANAGEMENT SYSTEMS AND METHODS

RELATED APPLICATION

This application claims the benefit of priority under 35 U.S.C. § 119(e) to U.S. Provisional Patent Application No. 62/800,103, filed Feb. 1, 2019, and entitled "Policy Enforced Data Management Systems and Methods," which is hereby incorporated by reference in its entirety.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY

The present disclosure relates generally to systems and methods for managing data. More specifically, but not exclusively, the present disclosure relates to systems and methods for managing access to data through enforcement of one or more associated rules.

Certain data management services may support rich access control for managed data. Actors using such services (human and non-human users) may be identified and authenticated, allowing for invocation of various data management service APIs. This alone, however, may not provide fine-grained access control to managed data. For example, simple access control systems that are based on users and/or groups with access control lists ("ACLs") may be less suitable for situations where complex data sharing is expected among parties in multiple organizations, where relationships between users and organizations are not strictly hierarchical and/or change over time, and/or the like. User and-or group-based access control systems may also not be able to easily model situations where organizations within hierarchies wish to impose constraints on organizations above or below them within the hierarchy and/or where value-based access control decisions are desired.

Various embodiments of the disclosed systems and methods provide a framework for data management and/or access control that uses one or more services that may include, for example and without limitation, one or more of an authentication service, a security service, a directory service, a catalog service, and/or a data service In certain embodiments, the security service may interact with an authentication service—a service that may support various identification and/or authentication operations. Consistent with embodiments disclosed herein, the security service may manage various access control determinations relative to governed data and/or other governed objects. Data access may be brokered using the data service, which may invoke in connection with data access processes the authentication service, security service, directory service, and/or the catalog service. In certain embodiments, the authentication service may be leveraged by other services to for authentication operations.

Certain embodiments of the disclosed systems and methods may employ an access control model that uses a "rule" as a fundamental unit of access control. Consistent with embodiments described herein, rules may specify, for example and without limitation, one or more of a subject, an object, one or more privileges, flags for each privilege (e.g., an allow and/or deny flag), a depth, one or more restrictions (in certain instances denoted as "R"), and/or a restriction combinator (in certain instances denoted as "RC"). Rules may be specified by rule sets and/or may be formed when a role, which may comprise policies, is granted to a subject by means of a role grant. In various embodiments, a policy may comprise a set of partial rules. A partial rule may be similar to a rule but not comprise a subject. A role may comprise a set of policies and a role grant may comprise a binding between a subject and a role. In some embodiments, terms may be defined in rules allowing for time-based access control.

Rule sets and/or role grams may be "attached" to an object within a data management directory in certain disclosed embodiments at an attachment point. Such an attachment point may define the root of a tree of objects that may be governed by the associated rules created by the rule set and/or role grant. A "depth" specified in a rule and/or partial rule may specify the depth in the directory tree hierarchy that the derived rules may be applied, starting from the lower of the object specified in the rule and the attachment point. For example, a rule and/or partial rule may specify a depth of 0, which may mean the rule and/or partial rule applies at the attachment point, a depth of 1, which may mean the rule and/or partial rule applies to an object at attachment point and the immediate children of the object, a depth of −1, which may denote that the rule and/or partial rule applies to an object at the attachment point and all descendants of the object, and/or the like.

BRIEF DESCRIPTION OF THE DRAWINGS

The inventive body of work will be readily understood by referring to the following detailed description in conjunction with the accompanying drawings, in which:

FIG. 23 illustrates an example of a directory tree with three rule sets consistent with certain embodiments of the present disclosure.

DETAILED DESCRIPTION

Figure 1:
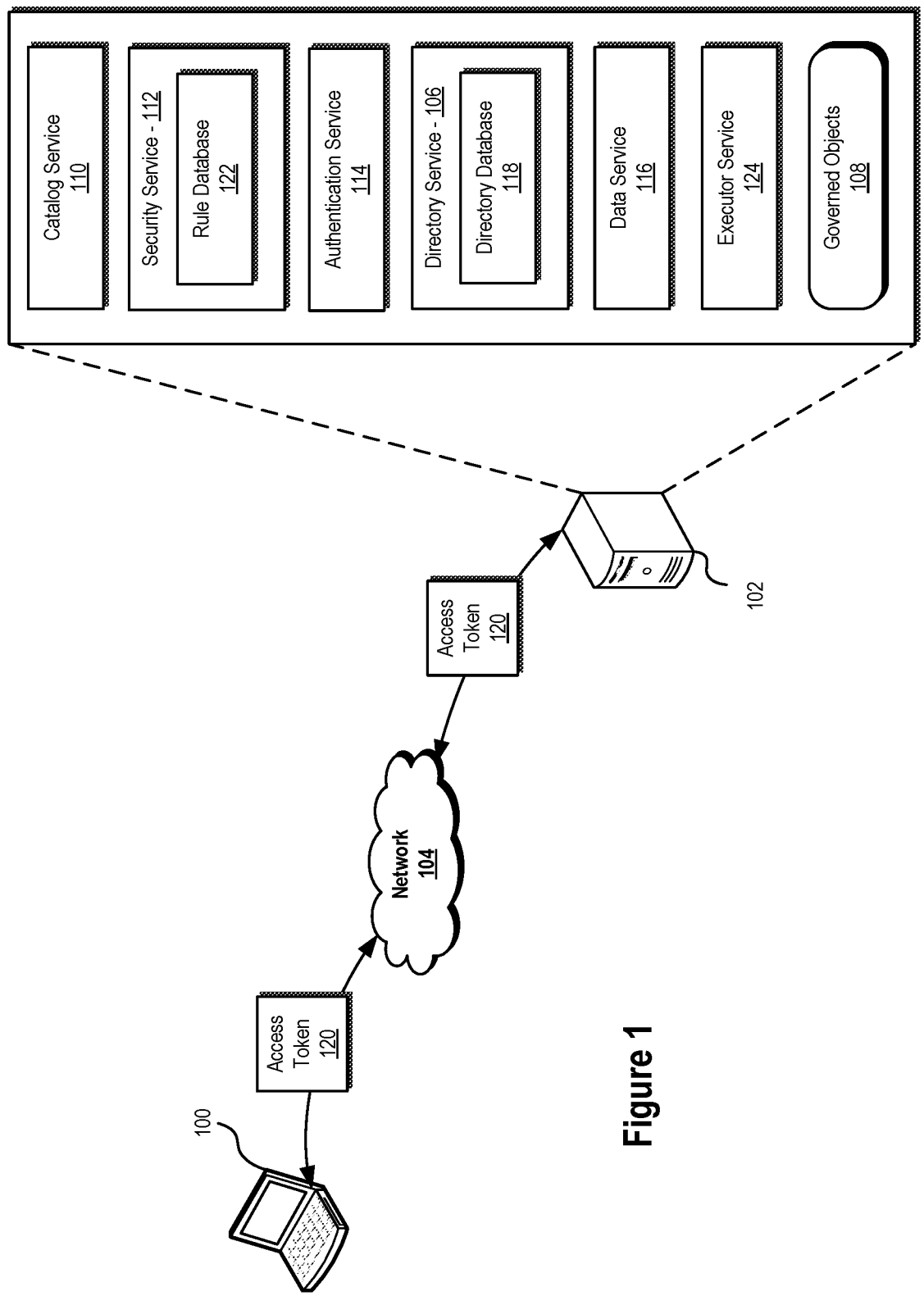
FIG. 1 illustrates an example of a data management architecture consistent with certain embodiments of the present disclosure.

A description of the systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to the drawings, wherein like parts may, in some instances, be designated by like numbers or descriptions. The components of the disclosed embodiments, as generally described and/or illustrated in the figures herein, could be arranged and designed in a wide variety of different configurations. Thus, the following description of the embodiments of the systems and methods of the disclosure is not intended to limit the scope of the disclosure but is merely representative of possible embodiments of the disclosure. In addition, the steps of any method disclosed herein do not necessarily need to be executed in any specific order, or even sequentially, nor need the steps be executed only once, unless otherwise specified.

Access Control Model Overview

As described above, in various embodiments, a rule may be used as a foundational unit of access control. Consistent with embodiments described herein, rules may specify, for example and without limitation, one or more of a subject, an object, one or more privileges, flags for each privilege (e.g., an allow and/or deny flag), a depth, one or more restrictions, and/or a restriction combinator. A policy may comprise an object that includes a set of partial rules. A partial rule may specify, for example and without limitation, one or more of an object, one or more privileges, flags for each privilege (e.g., an allow and/or deny flag), a depth, one or more restrictions, and/or a restriction combinator.

In various disclosed embodiments, a role may comprise a set of policies. A role grant may specify a binding of a subject and a role, and may be attached to an object in a directory. A rule set may comprise a list of rules. A rule may comprise a partial rule with a specified subject. A role grant may also comprise a set of policies. Rule sets and/or role grants may be attached to an object in the directory, which may become the root of a subtree of objects that may be governed by the rules.

In various embodiments, rule sets and/or role grants may be translated to a set of rules which may be maintained by a security service. The rules may be stored and/or combined to allow for relatively easy and/or fast responses to access control inquiries. Multiple rules (e.g., rules from different role grants and/or role sets that may be attached to objects on the path from a specific governed object to a root of a directory) may be applied within a rule set to govern a specific objects.

In some embodiments, rules may be ordered based on an "adjusted depth" in the directory. A set of rules may be queried by a security service, as described in more detail below. A "top-most" (e.g., highest priority) matching role that governs a particular governed object may define whether or not access is allowed and/or denied to a subject in an access control determination. Specifically, a top-most matching rule that matches the subject, object, and privilege specified in an access query may define whether or not access is allowed and/or denied to a subject in the access control determination. While the top-most rule that answers a particular security and/or access control query may determine the success and/or failure of an access control check, an entire set of governing roles anchor their restrictions and/or restriction combinators may be returned in a security query. This may allow a service making an access control inquiry (e.g., a data service invoking a security service) to apply the top-most and/or all restrictions in accordance with the restriction combinator.

Data Management Services

A variety of services may be used in connection with various aspects of the disclosed data management architecture including, for example and without limitation, one or more of the following services.

Authentication Service: An authentication service may authenticate subjects, issue access tokens to subjects, validate access tokens, and/or manage users, accounts, and/or organizations. In some embodiments, an authentication service may integrate with external identity and/or authentication providers (e.g., LDAP, Active Directory). In further embodiments, an authentication service may federate identification and authentication through OpenID/Connect. In some embodiments, token acquisition may use OAuth2 and/or OpenID/Connect. Authentication of user credentials may, in some embodiments, use password checking and/or WebAuthn (e.g., FIDO).

Directory Service: A directory service may manage the directory, which may comprise a tree of governed objects. The directory may include users, accounts, organizations, applications, clients, folders, rule sets, role grants, roles, policies, data sets, data sources, and/or other objects. The directory may maintain the governance relationships between governed objects consistent with the disclosed embodiments.

Security Service: The security service may perform and/or answer access control queries. In some embodiments, the security service may support APIs for various services to issue queries (e.g., structured queries such as, for example, "Does subject S have privilege P on object O?"). Other access control related queries may also be supported by the security service. In various embodiments, the security service may answer queries by evaluating rules associated with rule sets and/or role grants attached to objects in a directory. In certain instances herein, (e.g., in connection with embodiments that may use of policy functions) the security service may be referred to as a policy management service.

Data Service: The data service may support queries of data sets, enforcing governance and/or restrictions by querying the security system to generate access control responses based on on rules maintained by the security service. The data service may enforce governance and/or restrictions based on the responses received from the security service.

Audit Service: An audit service may maintain audit records associated with security relevant operations performed by subjects. Audit records may provide, in some embodiments, relatively fine-grain accounting of subjects, objects, and/or associated operations.

Catalog Service: A catalog service may support the creation and/or managing of data sets and/or data sources and/or their locations.

Executor Service: In certain implementations, an executor service may be used to manage executable workloads in a cluster, providing a secure sandboxed environment for executing one or more applications, isolated from one another, to ensure data remains security within the sandbox and unable to be exported unless allowed by applicable governance.

Data Management Architecture

FIG. 1 illustrates an example of a data management architecture consistent with certain embodiments of the present disclosure. In various embodiments, the architecture may include one or more actors, which may comprise human and/or non-human users that may perform an operation on a governed object within the data management architecture.

As discussed in more detail below, the architecture may comprise one or more client systems 100, a data management system 102, and/or one or more other systems and/or services. The client system 100, data management system 102, and/or one or more other associated systems and/or services may comprise at least one processor. The processor may be configured to implement a variety of device functions including, for example, executing applications, coordinating certain services, and/or the like. In some embodiments, the device and/or processor may further include a secure processing unit ("SPU"), a hardened and/or secure execution space, and/or a trusted execution environment ("TEE") with sufficient trusted and/or secure resources to implement certain more secure functions associated with data access control management and/or distribution and/or user profile and/or account information management.

The client system 100, data management system 102, and/or one or more other associated systems and/or services may comprise a variety of types of computing systems, combinations of systems, and/or other associated equipment (e.g., network infrastructure equipment and/or the like). For example, the client system 100, data management system 102, and/or one or more other associated systems and/or services may comprise any suitable computing system and/or combination of systems configured to implement embodiments of the systems and methods disclosed herein. In certain embodiments, the client system 100, data management system 102, and/or one or more other associated systems and/or services may comprise at least one processor system configured to execute instructions stored on an associated non-transitory computer-readable storage medium. The client system 100, data management system 102, and/or one or more other associated systems and/or services may further comprise software and/or hardware configured to enable electronic communication of information between the devices and/or systems via one or more associated network connections.

The client system 100, data management service 102, and/or one or more other associated systems and/or services may communicate using a network 104 comprising any suitable number of networks and/or network connections. The network connections may comprise a variety of network communication devices and/or channels and may use any suitable communication protocols and/or standards facilitating communication between the connected devices and systems. For example, in some embodiments the network 104 may comprise the Internet, a local area network, a virtual private network, and/or any other communication network utilizing one or more electronic communication technologies and/or standards (e.g., Ethernet and/or the like). In certain embodiments, the network connections may comprise a wireless carrier system such as a personal communications system ("PCS"), and/or any other suitable communication system incorporating any suitable communication standards and/or protocols. In further embodiments, the network connections may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network connections may incorporate one or more satellite communication links. In yet further embodiments, the network connections may use IEEE's 802.11 standards, Bluetooth®, ultra-wide band ("UWB"), Zigbee®, and or any other suitable communication protocol(s).

The data management system 102 may implement a variety of services including, for example and without limitation, a directory service 106, a catalog service 110, a security service 112, an authentication service 114, and/or a data service 116. In some embodiments, a directory service 106 may manage a set of governed objects 108 and/or the relationships these objects have to other objects. Although illustrated as separate services, it will be appreciated that various functionality of the described services may be implemented by a single service and/or any suitable combination of services. In further embodiments, some and/or all of the illustrated services may be distributed. For example, in certain embodiments, some and/or all of the illustrated services may be implemented across a network using any suitable number of systems.

A governed object 108 may represent any data within the data management platform for which access is governed. A governed operation may comprise an operation to be performed by some actor on a governed object. Consistent with various aspects of the disclosed embodiments, services implemented by the data management system 102 may maintain authentication information about actors and/or may issue access tokens 120 that can be used to authenticate with service endpoints of the data management system 102.

In some embodiments, in addition to managing the data structures of many objects (e.g., users, accounts, groups, organizations, and/or the like), the directory service 106 may also manage placeholder objects where the actual data (i.e., fields) of the objects may be managed by other external services. For example, a catalog service 110 may manage data sets and/or data sources. These objects may be registered with the directory service 106 which may place them within a directory tree included in a directory database 118. Their existence in the directory tree may allow the security service 112 to respond to access control queries involving the objects (e.g., access control queries relating to a specific subject and/or privilege). In some implementations, to retrieve specific information about these objects and/or to access the data that the objects represent, the catalog service 110 may be consulted. In another example, an executor service 124, which may manage clusters, components, workloads, deployments, image sources, and/or vaults, may register these objects with the directory service 106 and, subsequently, invoke the security service 112 in connection with access control determinations relating to these objects.

As discussed above, a governed operation may be associated with a privilege. Privileges may be specified in rules. Accordingly, when a subject wishes to perform a specified operation on a governed object, the managing service (e.g., a data service 116) may specify the corresponding privilege for the requested operation and perform an access control determination query using the security service 112 specifying the requested subject, object, and/or privilege.

Authentication

Consistent with various disclosed embodiments, actors, whether human or non-human, may authenticate with an authentication service 114. In certain embodiments, the authentication service 114 may be provided by a data management system 102. In further embodiments, the authentication service 114 may be a separate and/or a standalone service. For example, the authentication service 114 may support federation with other identification and/or authentication providers and may delegate authentication responsibilities to those providers. In at least one non-limiting example, the authentication service 114 may support LDAP and/or Active Directory integration and/or support federated OpenID/Connect authentication with external OpenID/Connect providers. Consistent with various aspects of the embodiments disclosed herein, the integration of an authentication service 114, a directory service 106, and a security service 112 may allow for locating a subject front an access token and/or from other identifying information associated with an actor (e.g., an e-mail address and/or the like).

In some embodiments, the authentication service 114 may maintain user information, organization information, account information, password information, and/or the like in persistent storage, and may use this information to authenticate users and/or issue access tokens 120. The users, organizations, and/or accounts may be registered in the directory database 118 (along with other governed objects 108), as these objects are, themselves, governed objects.

In various embodiments, regardless of whether the authentication service 114 is involved in authenticating an actor and/or whether it delegates aspects of authentication to an external authentication service provider, account, organization, and/or user information may be stored in the directory database 118 as governed objects and/or subjects. In some embodiments, while the authentication service 114 may delegate certain aspects of credential checking to an external service provider, the authentication service 114 may nevertheless generate associated access tokens 120 and/or ensure subject-related entities (e.g., users, accounts, organizations, groups) are reflected in the directory database 118.

In the LDAP case described above, an external LDAP directory may be synchronized with an internal directory managed by the directory service 106 so that mirror objects exist in the directory database 118. Such objects may be used by the authentication service 114 in connection with various authentication processes and/or other data management components for governance and/or accessing checking processes and/or aspects thereof.

To make access control system decisions, a security service 112 (which in some embodiments may be provided by the data management system 102 and/or be a separate and/or standalone service) may use information regarding the identity of actors performing operations within the data management architecture. The security service 112 may interact with the directory service 106 and/or the directory database 118 managed by the directory service 106 to perform access control decision functions. In some embodiments, an access control determination may involve validating an access token 120 issued by the authentication service 114 and/or identifying a subject associated with the access token 120. In certain embodiments this determination may be performed prior to basing an access control decision based on the identified subject. Authenticating actors may ensure knowledge of who the requesting subject is in order to effectuate access control decisions. Requiring that operations be performed by authenticated actors may ensure that, among other things:

The identity of an actor performing an operation is known.

A rule may be evaluated to determine whether an operation can be performed, leveraging an actor's identity as a subject in applicable rules (along with other information if applicable).

An audit record may be stored that identifies the actor, the governed operation, and/or the object on which the operation is performed.

Audit records may be used to trace actions by a given subject and/or operations on a given object.

In various embodiments, authentication of an actor may involve evaluating credentials presented by the actor (e.g., evaluating an access token 120). The credentials may comprise, for example and without limitation, e-mail address, username, password, and/or other user identification information and/or possibly using signed challenges and validating associated signatures (e.g., FIDO2). In certain embodiments, this may occur when an actor logs into the data management system 102. Access tokens 120 may be valid for some limited period of time, and the validity period can be configured by the authentication service 114. OAuth2 refresh tokens may also be issued by the authentication service 114 so that actors can refresh expired access tokens 120.

Certain APIs associated with the data management architecture may require the presentation of an access token 120. Service endpoints may validate the access token 120 before providing services. In some embodiments, services may cache access tokens 120 for limited periods of time to improve performance.

The data management system 102 may provide an endpoint for data management services to identify an actor associated with an access token 120. The endpoint may return information such as, for example, the organization the actor belongs to, whether the user is a human user or a non-human source, and/or an application ID.

Subjects

Subjects, which may be referred to in some instances as actors, may be represented as persistent data stored in the directory database 118 as governed objects. For example, in the case of an account, the account object may be stored in the directory database 118 subordinate to the organization to which the account belongs. When a new actor (human or non-human) is created by the authentication service 114, a corresponding object may be created in the directory database 118 by the directory service 106. For example, when an account is created, a corresponding account object may be created in the directory database 118 and its parent specified as being the owning organization object.

When rules are evaluated in connection with checking access for a given subject, the subject's relationship, as reflected in the directory database 118, to organizations and/or groups in the directory database 118 may be used to determine whether a given rule applies. An object specified in an access control query, if resident in the director database 118, specifies a point in the directory database 118 where rules attach to the object and/or any parent of the object up the directory root.

In various embodiments, groups and/or organizations may be stored in the directory database 118 and links between these grouping constructs and/or accounts may be made. As discussed herein, these links represent membership of the account in the group and/or organization. An actor specified in an access control check, which may be referred to in certain instances herein as the subject of the access control check, may be used to select applicable rules in a database managed by the security service 112, which may be included in the directory database 118, and/or by a separate database (e.g., rules database 122) managed by the security service 112.

If a rule specifies an account as its subject, then the rule may be applicable if the rule's subject matches the actor. If a rule specifies a group as its subject, then the rule may be applicable if the actor is a member of the rule's group subject. If a role specifies an organization as its subject, then the rule may be applicable if the actor is a member of the rule's organization subject. It will be appreciated that for a rule to be applicable, the privilege and object specified in an access control query may also need to match a rule before the rule may be used in determining an appropriate response to an access control query.

The directory may be used to determine whether a subject is a member of a group and/or organization (e.g., specified as a subject in a potentially applicable rule) and/or to collect the set of rules that govern a specified object. Consistent with various aspects of the embodiments disclosed herein, the integration of an authentication service 114, a directory service 106, and a security service 112 may allow for location of a subject from an access token 120 and/or front other identifying information associated with an actor (e.g., an e-mail address and/or the like).

Governed Objects

In some circumstances, not all objects within the data management architecture may be governed objects. Objects (e.g., a data set, a data source, a folder, a file, a row, a column, etc.) for which rule-based access control and/or auditing is desired, however, may be considered governed objects and may each be represented by a governed object in the directory database 118. For example, if a data set is uploaded to the data management system 102, a directory service API may be invoked to create a data set object for the data set. The object may be associated with a globally unique ID managed by the directory service 106 and may be returned to the caller. This may be similar to what occurs when any object managed by the directory service 106 is created (e.g., users, organizations, accounts, folders, and/or the like).

In certain embodiments, a catalog service 110 may manage data sets and/or data sources external to the data management system 102. These objects may be registered with the directory service 106 and associated entries may be created in the directory database 118 that function as "stand-ins" for the actual data sets and/or data sources managed by the catalog service 110. Objects that are directly managed by the directory service 106 (e.g., users, organizations, accounts, folders, applications, clients, etc.) may be stored directly within the directory database 118.

When an actor attempts to access a governed object 108, a service that manages the governed objects 108 may invoke a security service API to determine whether the subject should be allowed access and what restrictions, if any, should be applied. In certain embodiments, for external objects, the catalog service 110 and/or an executor service 124 may manage the governed objects, whereas for internal objects the directory service 106 may manage the objects itself. In either case, in various embodiments, the managing service (e.g., the directory service 106, the catalog service 110, and/or the executor service 124h) may invoke a security service API to determine whether the actor should be allowed access and/or with what restrictions.

In some embodiments, governed object types may be chosen in a manner that considers the desired granularity of access control. Row and/or column governance within a dataset may in certain embodiments, use a governed object that represents the entire data set. Restrictions applied in governance determinations, as discussed in more detail below, may be used to provide row and/or column access control in a governed dataset. In this manner, a whole object (e.g., a file) may be a unit of governance and/or the file may be divided into smaller constituent parts that may be governed separately with associated distinct objects.

For example, in some embodiments, an entire collection of rows in a table of data can be represented as a single governed object. In certain implementations, this could preclude performing access control on the individual row or column level. If such granular access control is desired, a data set may be treated as a collection of governed objects (e.g., each governed object representing a row in a table and/or the like). Similarly, access control may be implemented at the column level, in which case individual columns of a data set (or collections of like data sets) might be represented by a governed object. In further embodiments, a tree structure of governed objects may be implemented, and rules associated with top-most governed object nodes, such as leaf nodes that are not associated with overriding rules, may inherit parent rules from higher-level governed object nodes.

In some embodiments, restrictions may be employed. In certain embodiments, restrictions may govern row and/or column level access control within a data set. In some embodiments, the security service 112 may perform access control decisions relative to governed objects (e.g., data sets). The data service 116, which may perform queries to database management systems (e.g. PostgreSQL) and/or otherwise broker access to data sets and/or data sources associated with governed objects 108, may use restrictions returned by the security service 112 to limit the rows and/or columns returned to the subject.

When trusted data management service components create new (e.g., real) objects within the service, they may invoke the directory service API to create a corresponding governed object in the directory database 118.

A variety of governed objects may be used in connection with the disclosed embodiments. For example, governed objects may include, without limitation, one or more of:
Data sets (e.g., a collection of rows in a table or a file).
Data sources (e.g., actual data sources that back data sets).
Folder (e.g., a collection of objects).
Data science algorithms (e.g., code use to create a model).
Models (e.g., models created through machine learning).
Derived data sets (e.g., data sets created by applying some algorithm, transformation, and/or operation to another data set).

Governed Operations

Operations performed on a governed object consistent with certain embodiments disclosed herein may involve the examination of rules that may be derived from and/or included in rule sets and/or role grants to determine whether a subject can perform a specified operation on a specified object and/or whether a subject is explicitly denied the ability to perform the specified operation on the specified object.

Consistent with aspects of the disclosed embodiments, subjects and/or actors allowed to govern a specific object and/or collection of objects may create rule sets containing a list of rules that specify whether a given subject can perform a given operation on a given object. Rules may specify that the operation (i.e., the privilege) is allowed or denied. Rules in a rule set may be ordered, and rule sets in the directory along the path of the object up to the root object may also be ordered. This may result in a strict ordering of applicable rules which may form the input to access checking primitives. In some embodiments, in addition to a subject, privilege, an allow/deny flag, and/or an object, rules may further comprise a restriction and/or restriction combinator and/or a depth.

Rules may further be introduced to govern an object through defined policies, roles, and/or role grants. Role grants may be created to specify governance. A subject specified in a role grant may be used within partial rules in policies included within the role specified in the role grant to form full rules.

In some embodiments, access control determinations may involve sorting rules and identifying a first rule that applies to the parameters of the access control query—the subject, object, and privilege. The first matching rule may, in some instances, take precedence over subsequent rules.

Governed operations may be chosen with an appropriate degree of granularity. For example, an access operation may be distinguished between read and write access operations. Similarly, a write operation may be further separated between write operations with rights to delete and write operations without rights to delete.

Governed operations may be applied to many different types of governed objects. For example, governed operations such as list, view, modify, and/or delete operations may apply to all governed objects. Certain operations may be specific to a set of governed objects such as, for example, querying data.

As detailed above, an access control query may include at least three parameters: a subject, an object, and a privilege, which may be associated with a governed operation. Accordingly, to govern access on a user's ability to apply a given machine learning algorithm (which may be represented as a governed object) to a given data set, two access control checks may be performed—one on the machine learning algorithm object and one on the data set object. In further embodiments, a privilege may be defined that represents a specific machine learning algorithm, and a single access check may be performed to determine whether the subject has permission to apply the specific machine learning algorithm (i.e., the privilege) on the data set (i.e., the object).

A variety of governed operations may be used in connection with the disclosed embodiments. For example, governed operations may include, for example and without limitation, one or more of:
Data set operations including, for example and without limitation, select data, insert data, update data, delete data, and/or the like.
Algorithm and/or transformation operations including, for example, applying a machine learning algorithm.

General operations including, for example, access delegation and governance specification operations.

Rules and Restrictions

As detailed above, in various embodiments, a rule may be used as a fundamental access control object. Rules may be listed in rule sets. Partial rules may be specified in policies, and policies may be listed in roles with role grants binding a subject to a role. In this binding, the subject may be merged with partial rules to form a full rule specifying, among other values, the subject, object, and privilege. Partial rules and rules may also specify an optional restriction and/or restriction combination. If an access control query (e.g., a call made to the security service 112) returns true, it may return restrictions collected from matching rules and the restriction combinators. A service and/or application managing governance, such as the data service 116, may apply the restrictions. For example, the data service 116 may narrow a database query in consideration of the restriction.

Applicable rules may be ordered, with higher precedent rules at the head, so that a first matching rules specifies whether access is granted or not. In some embodiments, all matching rules that specify restrictions may be returned to the caller issuing the access control query so that their restrictions can be combined, if necessary.

Restrictions may, in some embodiments, use a governing service specific domain specific language ("DSL"). In some embodiments, the data service 116 may use a DSL few its restrictions, which in certain embodiments may be a different DSL than that used by another service that performs governance (e.g., the security service 112). For example, the restrictions used by the data service 116, may specify limitations on which rows and columns of a governed data set can be returned. The restrictions used by the data service 116, for example, can specify limitations on which rows and columns can be returned. Similarly, the directory service 106 and/or an executor service 124 may use a different DSL for restriction expression than that of the data service 116.

Consistent with various aspects of the disclosed embodiments, rules may be managed by the security service 112. When a rule set and/or role grant is created, the directory service 106 may invoke the security service 112 to add rules to a rule store (e.g., rule database 122) managed by the security service 112. Before rules sets and/or role grants can be used, they may be "attached" to another object in the directory database 118. The object to which they are attached may become the "attachment point" for the rules implied by the rule set and/or role grant. This attachment point may provide an upper bound with respect to the directory tree for any governed objects named within the implied rules. In this manner, an effective rule may not govern objects any higher in the hierarchy than the attachment point.

For example, if a rule in a rule set specifies as its object the root of the directory tree, and the rule set is attached to some organization, the effective object of the rule may be narrowed to the organization. If that rule specifies a depth>0, then it may govern all objects subordinate to the attachment point. Rules from multiple rule sets and role grants can govern any given object. In this manner, if there are rules attached to a given object (e.g., a data set), it does not mean that only those rules apply. Indeed, any rules from rule sets and/or role grants from the object, up to the directory tree root, may be candidate rules to govern an object. If a rule is attached to a data set, it may become a rule, potentially of many rules, that may govern that data set, including rules above the data set in the directory up to the root.

When a service and/or application wishes to make an access control query, it may provide the security service 112 with the access token 120 of the actor that invoked the service and/or application. The security service 112 may validate the access token 120 and find the corresponding subject (e.g., an account). The identified subject, privilege, and/or object may be used to discriminate among the entire set of rules. The service and/or application may also specify the object and privilege. In this manner, the access control query may be a request to answer the question: "Does this subject (identified by access token 120), have this privilege on this object?"

When the security service 112 is invoked to perform an access control check, it may locate applicable rules. In certain circumstances there may be many such rules, depending on organization structure and/or governing organizations within that structure. For example, a department (Department A) of a company (Company A) might both have rules governing the read operation on documents belonging to their respective organizational entities. It may be that Company A's policies override those of Department A's, or that Department A's and Company A's rules should both permit access before an operation is allowed.

In certain embodiments, "functional privileges" may be expressed as rules (e.g., via rules sets and/or role grams) attached to and referencing an object (e.g., an organization and/or account). An API and/or interface that wishes to check a functional privilege may use a rule-based access control check against the appropriate object to see if a subject has a required functional privilege. If so, the functionality is allowed; otherwise it is not. For example, a privilege may be generated that represents a functional operation (e.g., "create data set"), and a rule may be generated that allows or denies a given subject this privilege on an object (e.g. an application, and/or an organization). To determine whether the subject can create data sets, the security system may invoke a security service 112 access control query API specifying the subject, the appropriate object, and the functional privilege.

Access Control Evaluation

Consistent with embodiments disclosed herein, a data management service component (e.g., the data service 116) wishing to check an actor's rights to perform an operation on a governed object may invoke the security service 112, passing to the security service 112 the access token of the actor/subject, the ID of the governed object, and/or the ID of the privilege. The security service 112 service may locate the set of applicable rules and, in some embodiments, order these rules by priority. For example, as detailed above, higher priority rules that apply to the parameters of the access check query may determine whether the check returns true (i.e., allowed) or false (i.e., denied). When the access check returns true, matching rules that have restrictions may be returned (in order if applicable) along with any applicable restriction combinators. This may allow the data server 116 to combine the restrictions and/or to otherwise narrow the terms of access to the governed object.

Accounts, Groups, and Organizations

In various embodiments, groups and/or organizations may be included as governed objects. Accounts, groups, and/or organizations may be the subject of rules. In some embodiments, when a group is the subject of a rule, the rule may match the subject specified in an access control query if the subject (e.g., an actor) is a member of the specified group. The same may be true for organizations. In some implementations, organizations may contain sub-organizations (which may intern have different tiers of sub-organizations themselves). A subject may therefore be considered a member of an organization if they are either a direct member of the organization and/or any of its sub-organizations. In other words, an organization may form a tree of organizations and/or associated accounts, and a subject in an access control query may be considered a member of the organization if it is a member of any of die organizations in the tree. In various embodiments, groups may comprise other groups, organizations, and/or individual accounts.

In certain embodiments, access control determinations may involve inquiries regarding membership in organizations. Organizations may be represented as governed objects within the directory database 118. Consistent with various aspects of the disclosed embodiments, rules may specify an organization as the subject. An actor, which may be represented by an account object in the directory database 118, may be considered a member of the organization if that account is a direct member of the organization or member of any of its sub-organizations. This check may involve all organizations in the tree rooted with the organization from the rule. In this manner, in some instances, it may not be necessary to specify in rules all accounts (i.e., actors) who should have access to specific governed objects; rather, groups of actors, such as all accounts in an organization, may be specified by naming the organization in the rule. In certain embodiments, groups, which may be named as subjects in rules, may operate similarly. The directory database 118 may record the relationships between various governed objects and be used to determine account membership in groups and/or organizations.

Consistent with various disclosed embodiments, actors using the data management platform may be authenticated using and/or be represented as accounts in the directory database 118. When an actor invokes an API of the data management system 102, the access token 120 returned by the authentication service 114 during authentication may be used as a stand-in for the account and can be translated by the security service 112 into a corresponding account. In this manner, an access token 120 may denote an account which may be used as a subject in access control determinations in connection with the disclosed embodiments.

Entries in the directory database 118 may be used to reflect an organizational structure of one or more organizations. For example, governed objects may be included in the directory database 118. As rule sets and/or role grants are governed objects, they may be included in the directory. If the rule sets and/or role grants are attached to objects under an organization, they may become effectively owned and/or otherwise managed by the organization administrators. Parent-child relationships between governed objects and parent governed objects (e.g., a data set and its parent organization, an account and its parent organization, etc.), may be represented in the directory database 118.

In some instances, governed objects may become children (directly or indirectly) of organization objects. Therefore, if a governed object (e.g., a data set and/or a rule set) "belongs" to an organization, it may be implied that the governed object is subordinate to the organization object in the directory database 118. In some circumstances, organizations may be subordinate to other organizations.

As discussed above, in some embodiments, an object may be attached to at least one organization object, a folder object, and/or any other object that functions as a container of other objects within the directory tree. For any given governed object in the directory, its immediate parent (which may be linked via a hard link) may be considered the "owning" parent, and that parent's parent, the object's grandparent, and so on up to the directory root. These parents may thus all be considered "owning" the object and/or may have attached rule sets and/or role grants that govern the object (e.g., directly and/or indirectly through a specified depth). For example, in the case of an organization object, the object may represent the "owning" organization, or more specifically, the organization that has the right to control governance for the governed object. In certain embodiments, other parents of a governing object may be presented through soft links, and may not necessarily be considered "owning" parents.

When governed objects are created, they may be included in the directory as a child of another governed object. That is, when an object is created, the parent object may be specified. To insert a child object "under" a parent object, an actor may require the necessary privilege on the parent object (e.g., sys:directory:add-child). In this manner, inserting objects in the directory itself may be a governed operation. Deleting a child object may also require the necessary privileges on the child object (e.g., sys:directory:delete) and the parent object (e.g., sys:directory:delete-child). A variety of directory operations may be governed including, for example and without limitation, listing objects (e.g., listing objects under a parent), viewing objects, updating objects, deleting objects, and/or the like.

As discussed above, actors may be represented by account objects. Actors may be associated with organizations. A user may be a member of a number of organizations. Organizations may be members of higher-level organizations. The directory service 106 may maintain indications of these relationships in its directory database 118. In some embodiments, accounts, organizations, governed objects (e.g., data sets), and/or governance objects (e.g., rule sets and/or role grants) may be modeled as objects and/or nodes in a directory tree stored in the directory database 118. The relationship between these objects and/or nodes may be represented as "links" in the directory database 118.

A variety of information may be determined from the directory database 118 including, for example and without limitation one or more of:
  Whether an actor is a member of an organization (e.g., directly or indirectly).
  Parent objects that govern the set of rules associated with a governed object.
  The set of rules that are either directly associated with a governed object and/or implemented by the parent objects, which may in some instances comprise owning organization or organizations.

An actor may be associated with one or more trees of organizations, each of these organizations possibly having rules governing a given governed object. In some embodiments, objects and links between them, which may form a directed acyclic graph and/or a directory tree, may be represented using a relational database. The relational database may include entries representing governed objects and their relationships to other governed objects. Consistent with embodiments disclosed herein, these relationships may be used to determine membership of accounts in groups and/or organizations, and/or to locate the set of governing objects (e.g., rule sets and/or role grants) that may be govern any specific governed object. Following chains of membership links between actors and organizations, and/or between governed objects and governance objects may be implemented using a relational database. Further embodiments may use a graph database, as discussed in more detail below.

Objects and Links

As discussed above, governed object nodes within a directory database 118 may include, for example and without limitation, one or more of accounts (which may represent various actors), organizations, governed objects (e.g., data sets), folders, rule sets and/or role grants. Links may represent the relationships between the various objects.

In certain embodiments disclosed herein, a plurality of links may be used. For example, certain embodiments may employ hard links and soft links. Hard links may comprise normal parent-child links, as discussed above, and may represent an owning relationship between a parent and a child object. In some embodiments, a hard link path between objects may be traversed from a specific object up to the root of the associated directory tree to locate governance objects whose rules can govern the given object.

Soft links may be used to represent membership of accounts, groups, and/or organizations within a parent group. Soft links may be further used to represent membership of a governed object within a folder. An object within a folder and/or group may derive its governance through hard links from that object up to the root of the directory tree.

It will be appreciated that a number of variations can be made to the architecture, relationships, and examples presented in connection with FIG. 1 within the scope of the inventive body of work. For example, certain device, system, and/or service functionalities described above may be integrated into a single device, system, and/or service, and/or any suitable combination of devices, systems, and/or services in any suitable configuration. Thus, it will be appreciated that the architecture, relationships, and examples presented in connection with FIG. 1 are provided for purposes of illustration and explanation, and not limitation.

Figure 2:
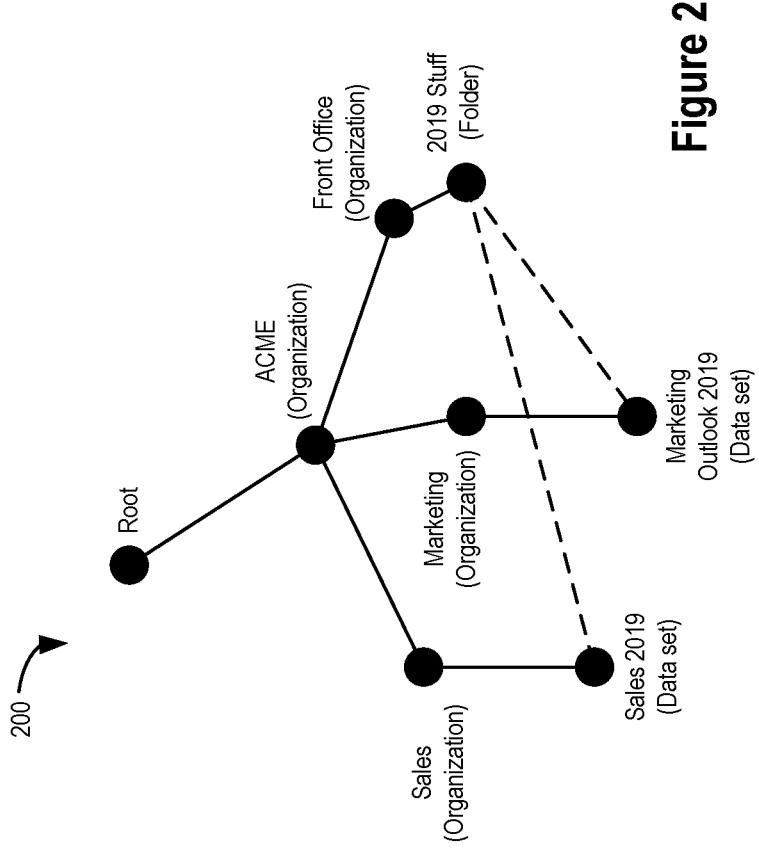
FIG. 2 illustrates an example of a directory tree including hard links and soft links consistent with certain embodiments of the present disclosure.

FIG. 2 illustrates an example of a directory tree 200 including hard links and soft links consistent with certain embodiments of the present disclosure. In the non-limiting example shown in FIG. 2, an organization named "ACME" may have three associated sub-organizations called "Sales", "Marketing", and "Front Office." Sales may have a data set called "Sales 2019" and Marketing may have a data set called "Marketing Outlook 2019", Sales may own "Sales 2019" and a hard link (e.g., shown as solid line in tree 200) may be established between the two objects in the directory. Similarly, Marketing may own "Marketing Outlook 2019" and thus a hard link may exist between these two objects. Front Office may have a child object folder, called "2019 Stuff". This folder may have soft links (e.g., shown as a dashed line in tree 200) to both "Sales 2019" and "Marketing Outlook 2019". For the purpose of governance, the path from "Sales 2019" through Sales" upward in the directory tree is consulted to locate rules governing the Sales 2019 data set. Similarly, the path from the Marketing Outlook 2019 dataset through Marketing upward in the directory tree 200 may be consulted to locate rules governing the data set. In some embodiments, any rules associated with the folder and "Front Office" may not been needed in connection with the access control decision. The soft links that link these data sets to the 2019 Stuff folder may be used for grouping, and may be listed (by virtue of the soft links) and located through those soft links, but the data sets so located may be governed by the owning organization-managed rules.

Trusted Access Control Intermediary

Figure 3:
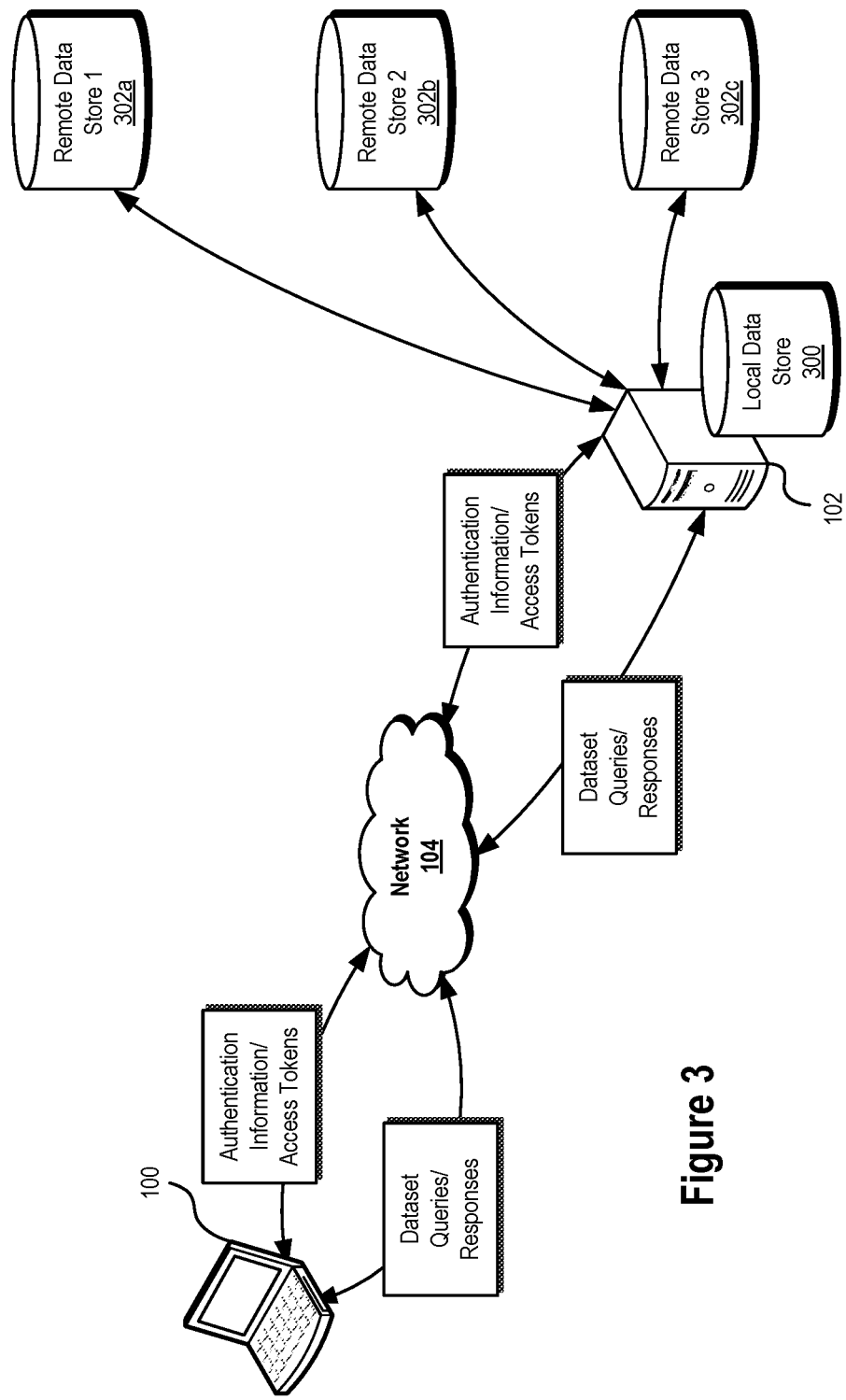
FIG. 3 illustrates an example of a data management system operating as a trusted access control intermediary between a client system and one or more data stores consistent with certain embodiments of the present disclosure.

FIG. 3 illustrates an example of a data management system 102 operating as a trusted access control intermediary between a client system 100 and one or more data stores 300, 302a-c consistent with certain embodiments of the present disclosure. As detailed above, various services implemented by the data management system 102 (and/or one or more external service providers such as an identity and/or authentication service provider) may be used to facilitate authentication and/or access control to governed objects consistent with certain embodiments disclosed herein.

For example, an authentication service operating on the data management system 102 may be used to authenticate identification information submitted by a client system 100 and/or an associated subject, issue access tokens to authenticated subjects, and/or validate access tokens in connection with various aspects of the disclosed embodiments. In some embodiments, one or mere external services providers providing identity and/or authentication services may be used in lieu of and/or in conjunction with an authentication service operating on the data management system 102 in connection with various aspects of the disclosed authentication processes (e.g., validating authentication information, issuing access tokens, validating access tokens, and/or the like).

In some embodiments, data resources and/or other governed objects may not necessarily be integrated, managed, and/or otherwise stored directly within the data management system 102, but the data management system 102 may nevertheless be configured to operate as a trusted access control intermediary and/or broker for implementing access control with the data resources stored and/or otherwise managed by one or more separate data stores, systems, services, and/or different silos and/or organizations. For example, as illustrated, the data management system 102 may implement access control functionality for data resources stored within a data store 300 local to the data management system 102, but may also operate as a trusted access control intermediary and/or broker for implementing access control functionality for one or more separate and/or otherwise remote data stores 302a-c.

In some embodiments, access to primary data resources, located on remote data stores 302a-c may be restricted, at least in part, to the data management system 102, which may function as an intermediary and/or broker to govern, restrict, and/or otherwise filter access to the primary data resources. For example, a data service implemented by the data management system 102 may expose an API to the client system 100 which may allow queries to be made on one or more governed data sets which may be resident on the data management system 102 and/or stored by one or more remote data stores 302a-c managed by the data management system 102.

Data sets and/or governed resources stored by the remote data stores 302a-c may be associated with one or more referential, pointer, and/or placeholder entries in a directory database managed by a directory service of the data management system 102. The referential, pointer, and/or placeholder entries may, in some embodiments, themselves be governed objects, but may also be representative of actual governed data sets stored by the remote data stores 302a-c. By including objects in the directory database, whether they be objects included in a resident data store 300 of the data management system 102 and/or objects referencing one or more data stores 302*a-c*, the data management system 102 may facilitate access control determinations regardless of whether the data set resides within the data management system 102 and/or elsewhere (e.g., determining what rules sets are attached to the data and/or what rules govern applicable objects, etc.).

In certain embodiments, the data management system 102 may store and/or otherwise cache certain data set information stored by remote data stores 302*a-c* in the local data store 300. For example, based on data access and/or query patterns (e.g., identified frequently accessed data sets and/or the like), the data management system 102 may locally cache certain data stored by the remote data stores 302*a-c* in the local data store 300 of the data management system 102. In certain embodiments, when data has been locally cached by the data management system 102, referential, pointer, and/or placeholder entries included in a directory database associated with the data may be updated to reflect that data has been locally cached by the data management system 102.

Authentication and Access Control Service Interactions

Figure 4:
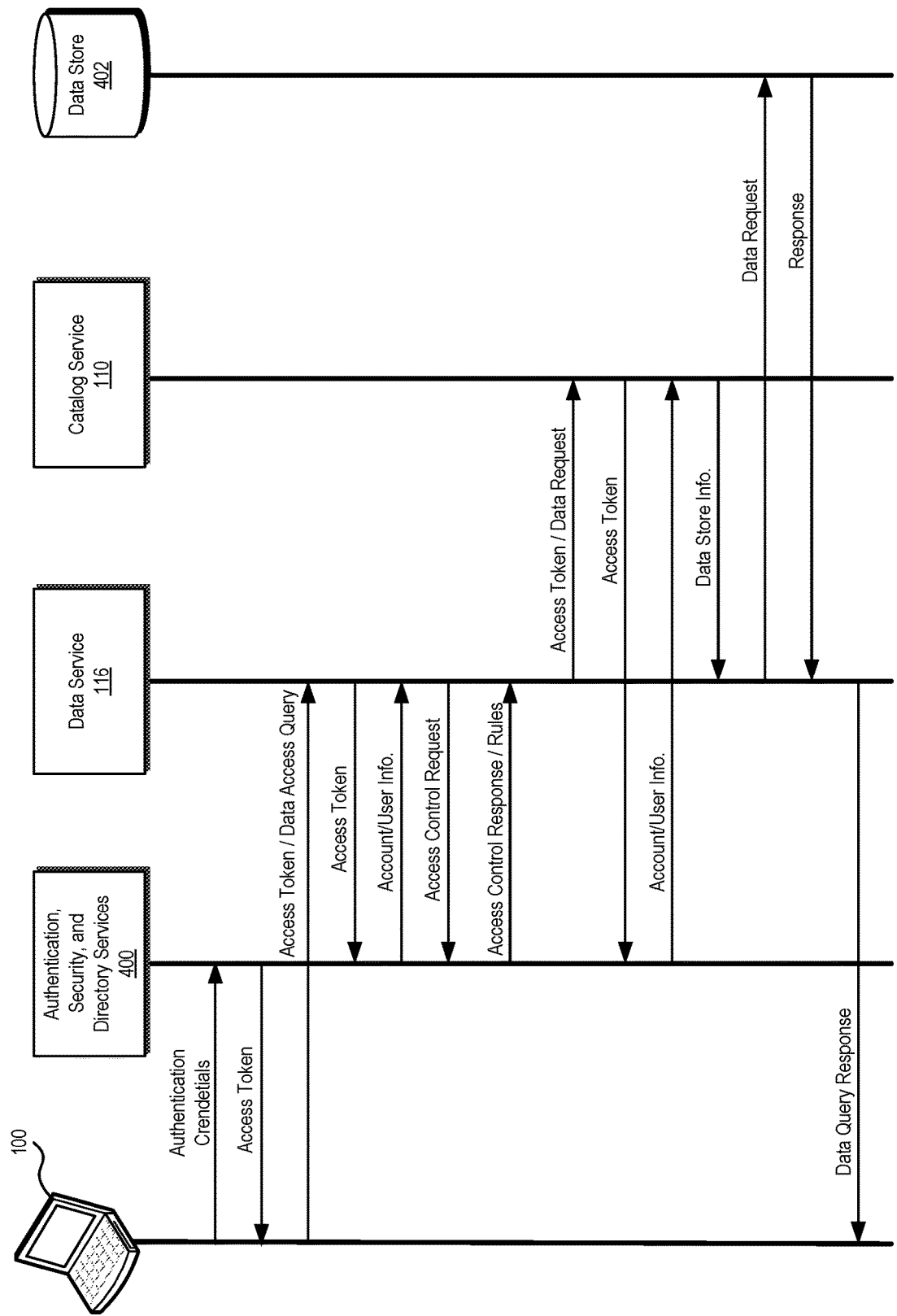
FIG. 4 illustrates a diagram of an example interaction between various services in connection with an authentication and access control process consistent with certain embodiments of the present disclosure.

FIG. 4 illustrates a diagram of an example interaction between various services 110, 116, 400 in connection with an authentication and access control process consistent with certain embodiments of the present disclosure. Specifically, FIG. 4 illustrates a process for authenticating and responding to data access query issued by client system 100. In certain embodiments, the illustrated services 110, 116, 400 may be implemented by a data management system and/or any suitable combination of systems and/or services. Few example, certain aspects of authentication processes may be implemented by a data management system and one or more external service providers such as an identity and/or authentication service provider. In addition, certain functionality described in connection with the illustrated services 110, 116, 400 may be performed by any suitable number of services and/or combinations thereof.

As illustrated, to initialize an authentication process, the client system 100 may communicate authentication credentials to a service 400 that may comprise an authentication service. The authentication credentials may comprise, for example and without limitation, one or more of an e-mail, a username, a password, an API key, any/or any other identifying account information.

The authentication service may evaluate and/or otherwise verify the authentication credentials provided by the client system 100 and, if the credentials are valid, the service 400 may issue an access token to the client system. In certain embodiments, the access token may comprise a bearer token that may comprise and/or otherwise represent rights associated with the client system 100 and/or an associated actor that provided the authentication credentials to the authentication service.

The client system 100 may communicate a data access query to a data service 116. The data access query may specify one or more data access query parameters that may include, for example and without limitation, one or more specified data sets and/or portions thereof, one or more requested operations to be performed on the specified data sets and/or any other suitable data access query parameters. In certain embodiments, privileges may be determined by the data service 116 (and/or another service endpoint) by mapping an operation to associated privileges. In some embodiments, in connection with the data access query, the client system 110 may further communicate the access token received from the authentication service.

In certain implementations, the data service 116 may be separate and/or otherwise distinct from the authentication service. Accordingly, to validate the data access query request, the data service 116 may call service 400 to validate the access token received from the client system 100. In response to a successful validation (e.g., a determination that the access token is valid and/or otherwise unexpired), the authentication service of service 400 may issue an authentication response that, in some embodiments, may comprise account and/or other user information (e.g., user identity information, user organization information, information relating to the client system 100, token expiration information, and/or the like).

In some embodiments, the access token validation information received from the authentication service may be cached by the data service 116 for use in future access token validation requests. Accordingly, the data service 116 may either validate the access token by calling the authentication service of service 400 or by checking validation information previously cached by the data service 116. In certain circumstances, if available, checking against previously cached validation information may be relatively quicker than calling the authentication service.

To perform an access control determination relative to the received data access query, the data service 116 may issue an access control request to a security service implemented by service 400. The access control request may query the security service as to what (if any) rights and/or privileges the subject of the data access query has relative to the requested data set and/or object, whether the subject has privileges relative to a specific operation specified in the data access request, and/or the like.

The security service may consult a directory database that may include a registry of governed objects that, in some embodiments, may be managed by a directory service implemented by service 400. If the security service determines that the subject does not have access rights and/or privileges, the security service may deny the data access query. If, however, the security service determines that the subject has data access rights, the service 400 and/or associated security service may return to the data service 116 an access control response that may include and/or associated rules, restrictions, and/or privileges relative to the data access request.

The data service 116 may issue a data request query to a catalog service 110 to determine a location of the data set associated with the data access query. In connection with this data request query, the data service 116 may further send the access token to the catalog service 110. For example, in certain implementations, the data service 116 may be separate and/or otherwise distinct from the catalog service 110. Accordingly, to validate the data request query, the catalog service 100 may call the authentication service of service 400 to validate the access token received from the data service 116 associated with the data request query. In response to a successful validation (e.g., a determination that the access token is valid and/or otherwise unexpired), the authentication service of service 400 may issue an authentication response to the catalog service 110 that, in some embodiments, may comprise account and/or other user information.

In some embodiments, the access token validation information received from the authentication service may be cached by the catalog service 110 for use in future access token validation requests. Accordingly, the catalog service 110 may either validate an access token by calling the authentication service of service 400 or by checking validation information previously cached by the catalog service 110 (which in some circumstances may be more efficient than calling the authentication service of service 400).

After successful validation of the access token, the catalog service 110 may return to the data service 116 location information relating to the data set associated with the data access query. For example, the location information may provide an indication as to a data store 402 (which may be local to a data management system and/or stored remotely by a separate data store that may use the data management system as a trusted intermediary and/or broker for managing access control) that stores the requested data set and/or a location within the data store 402 of the request data set.

Based on the location information received from the catalog service 110, the data service 116 may issue a data request to the data store 402 to retrieve the requested data. In some embodiments, the data request issued to the data store 402 may be modified, transformed, and/or otherwise filtered in view of the rules, restrictions, and/or privileges received from the security service as pan of the access control determination process. For example, if the data set is included in a SQL database managed by data store 402, the data service 116 may update a where clause in the SQL query statement issued to the data store 402 to filter out columns and/or rows in accordance with applicable rules, restrictions, and/or privileges.

In response to the data request, the data store 402 may communicate the requested data to the data service 116. The data service 116 may, in turn, return the data as part of a data query response back to the client system 100. In some embodiments, prior to returning the data as part of the data query response, the data service may modify, transform, and/or otherwise filter the data in view of the rules, restrictions, and/or privileges received from the security service as part of the access control determination process.

It will be appreciated that a number of variations can be made to the interactions, relationships, and examples presented in connection with FIG. 4 within the scope of the inventive body of work. For example, in some embodiments, access control requests issued by the data service 116 to a security service may occur following the request being issued to the catalog service 110 for data store location information and/or after retrieving the data from the data store 402 but prior to communicating the data to the client system 100, and/or the like. Thus, it will be appreciated that the interactions and examples presented in connection with FIG. 4 are provided for purposes of illustration and explanation, and not limitation.

Directory Tree and Access Control Examples

FIGS. 5-23, discussed in more detail below, illustrate conceptual diagrams showing a variety of examples of directory trees and associated rule sets included in a directory database consistent with various aspects of the disclosed embodiments. Examples of access control processes relative to the illustrated directory trees are also detailed. It will be appreciated, however, that the example directory trees and associated access control processes of FIGS. 5-23 are provided for the purposes of illustration and explanation, and not limitation.

Figure 5:
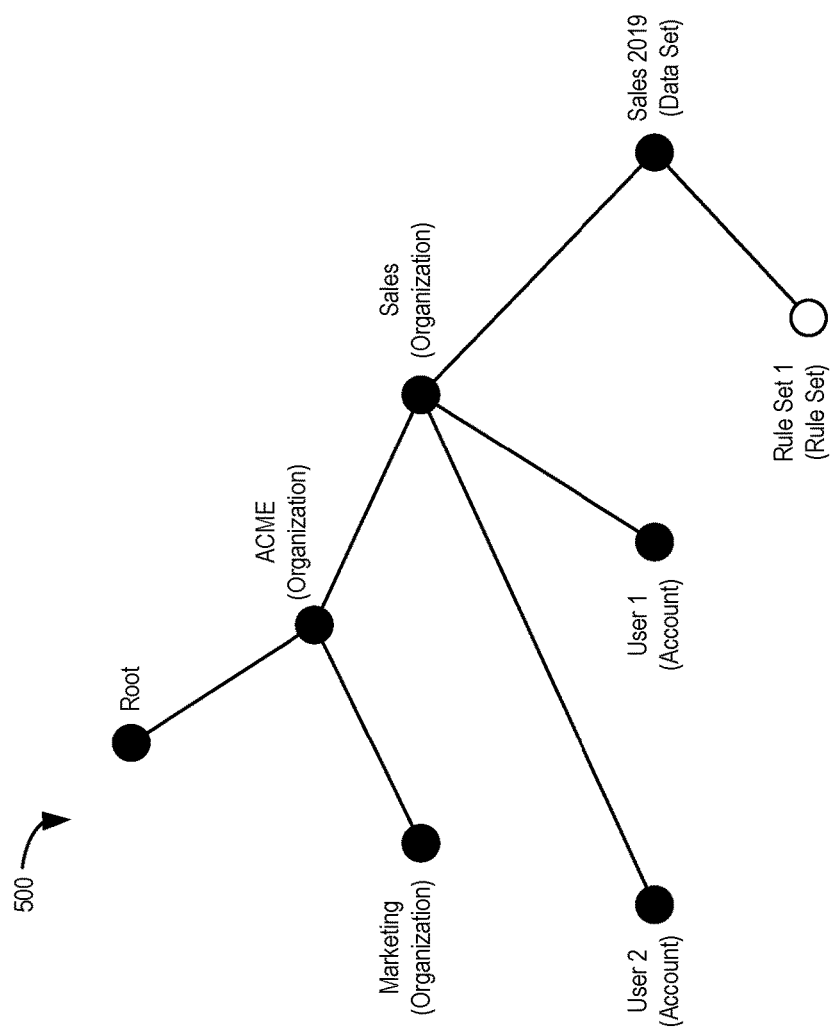
FIG. 5 illustrates an example of a directory tree including a top-level organization with two sub-organizations and an associated rule set directly attached to a data set consistent with certain embodiments of the present disclosure.

FIG. 5 illustrates an example of a directory tree500 500 including a top-level organization—ACME—with two sub-organizations—Marketing and Sales—and an associated rule set502—Rule Set 1—directly attached to a data set that is a child of the Sales organization—Sales 2019—consistent with certain embodiments of the present disclosure. As shown, there are two accounts under the Sales organization—User 1 and User 2—and a data set—Sales 2019. The rule set502 is attached to Sales 2019 and defines two rules. The first rule grants User 1 a view privilege on the Sales 2019 data set with an associated rule depth of 0. The second rule grants User 1 a quay data privilege on the Sales 2019 data set with an associated rule depth of 0.

When enforced by a security service in connection with an access control determination. Rule Set 1 will allow User 1 to view the Sales 2019 data set object and to perform queries (e.g., a query data privilege) on the Sales 2019 data set. The depth of 0 in each constituent rule of the rule set502 may indicate that the associated privilege (e.g., view and query data) apply only to the object referenced in the rules (i.e., Sales 2019) and not to any child objects in the directory tree500.

In certain embodiments unless specifically granted a privilege in a rule and/or rule set, none may be assumed. Accordingly, because User 2 is not named in any rule in rule set502 (e.g., name directly as a subject and/or indirectly as a member of a group and/or organization), and thus is not associated with any explicitly granted privilege. User 2 may not view and/or query data from the Sales 2019 data set object. Therefore, an access control request associated with User 2 directed to Sales 2019 would be denied by the security service.

Figure 6:
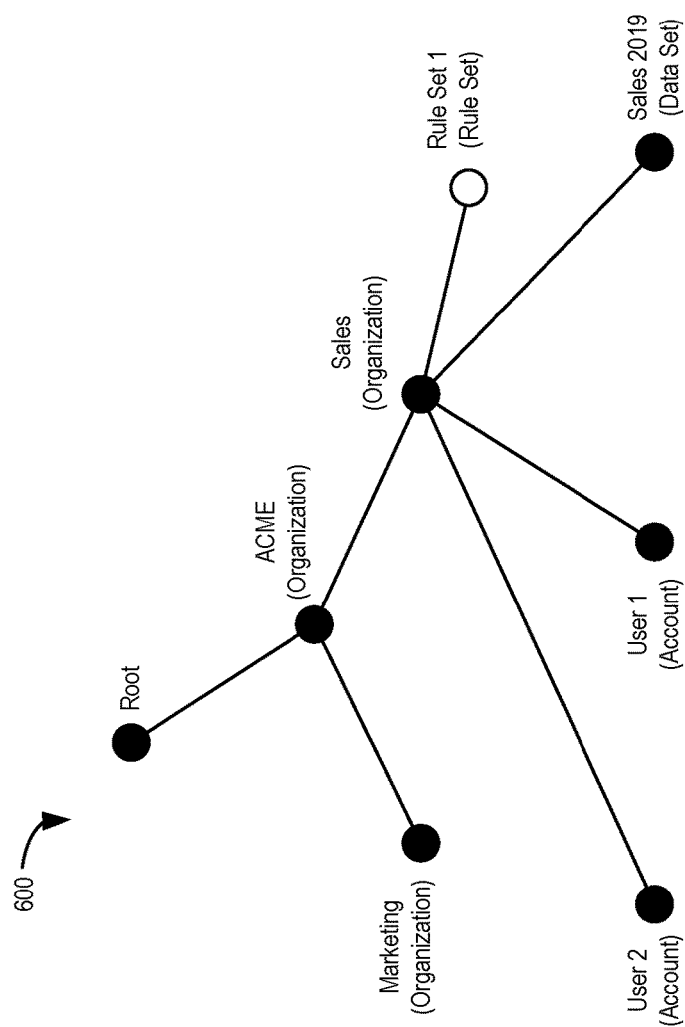
FIG. 6 illustrates an example of a directory tree including a top-level organization with two sub-organizations and an associated rule set attached to a sub-organization consistent with certain embodiments of the present disclosure.

FIG. 6 illustrates an example of a directory tree 600 including a top-level organization—ACME—with two sub-organizations—Sales and Marketing—and an associated rule set 602—Rule Set 1—attached to a sub-organization—Sales—consistent with certain embodiments of the present disclosure. Rule Set 1 may name the Sales 2019 data set as the object of the constituent rule set rules. In various embodiments, a rule set may be attached to an object and/or any of its parent objects up the directory tree 600 towards the root. Consistent with embodiments disclosed herein, if a rule set names an object below its attachment point, it may govern objects from the attachment point downwards in the directory tree 600 to the depth specified in an applicable rule.

In certain embodiments, the depth may be determined from the intersection of the object in a given rule and the attachment point. In some embodiments, the intersection may be defined as whichever is at a greater depth in the directory tree 600 as long as the attachment point is in the path from the root of the directory tree 600 to the object. If the object falls above the attachment point, the rule may not apply. If the object is not at or below the attachment point, the rule may also not apply. Accordingly, User 1 may query and view the Sales 2019 data set, even though the Rule Set 1 is attached to the Sales organization rather than directly to the Sales 2019 data set as described above in connection with FIG. 5.

Figure 7:
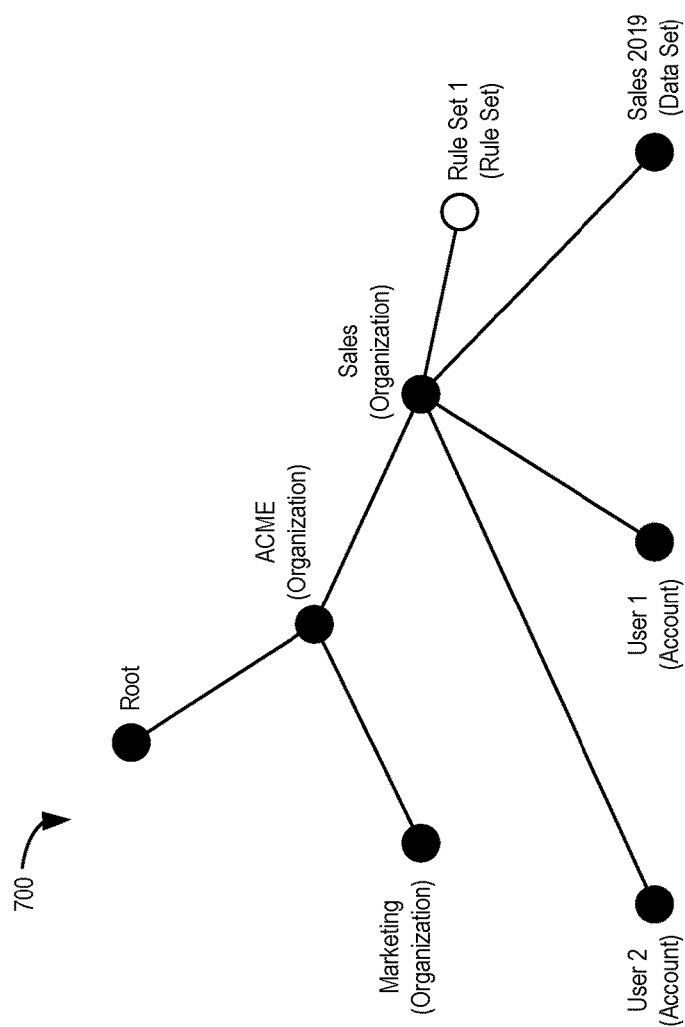
FIG. 7 illustrates an example of a directory tree including a top-level organization with two sub-organizations and an associated rule set attached to a sub-organization that includes rules having associated depth parameters consistent with certain embodiments of the present disclosure.

FIG. 7 illustrates an example of a directory tree 700 including a top-level organization—ACME—with two sub-organizations—Sales and Marketing—and an associated rule set 702—Rule Set 1—attached to a sub-organization—Sales—that includes rules having associated depth parameters consistent with certain embodiments of the present disclosure. As shown, the constituent rules of Rule Set 1 specify the Sales organization as the object of the rules and include depth parameters of 1. Accordingly, the rules of Rule Set 1 may govern the Sales organization and any objects that are immediate children of the sales organization. For example, in the illustrated directory tree 700, Rule Set 1 may govern the Sales organization, the User 1 and User 2 accounts, and the Sales 2019 data set.

In the illustrated example, the view privilege granted by the first rule of Rule Set 1 may allow User 1 to view the data of the Sales organization and its immediate children. In some embodiments, the view privilege may allow viewing the attributes of objects in a sub-tree rooted at the Sales organization to the specified depth. The specified depth of 1 may thus allow this privilege on the Sales organization object and its immediate children. Therefore, the query data privilege may not necessarily be directly applied in connection with the Sales organization object, but as the associated rule has depth 1, it may allow User 1 to query data from the Sales 2019 data set.

Figure 8:
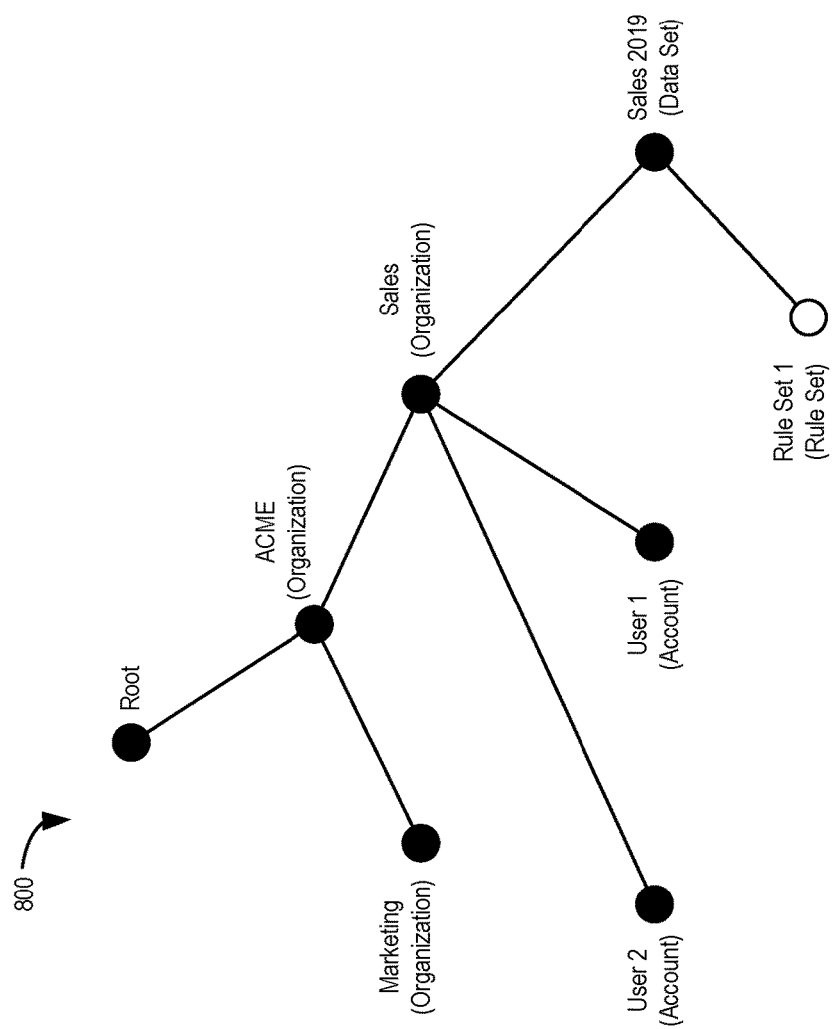
FIG. 8 illustrates an example of a directory tree including a top-level organization with two sub-level organizations and an associated rule set comprising two rules attached to a data set consistent with certain embodiments of the present disclosure.

FIG. 8 illustrates an example of a directory tree 800 including a top-level organization—ACME—with two sub-level organizations—Sales and Marketing—and an associated rule set 802—Rule Set 1—comprising two rules attached to a data set—Sales 2019—consistent with certain embodiments of the present disclosure. The rules in the rule set 802 may specify the Sales organization as the subject and the Sales 2019 data set as the object. The illustrated rules both have a depth of 0. Because the Sales organization is referenced as the subject of the rules of Rule Set 1, the rules may grant the privileges specified in the rules to all members of the Sales organization. Accordingly, in the illustrated example, both User 1 and User 2 may be granted the view and query data privileges with respect to the Sales 2019 data set.

Figure 9:
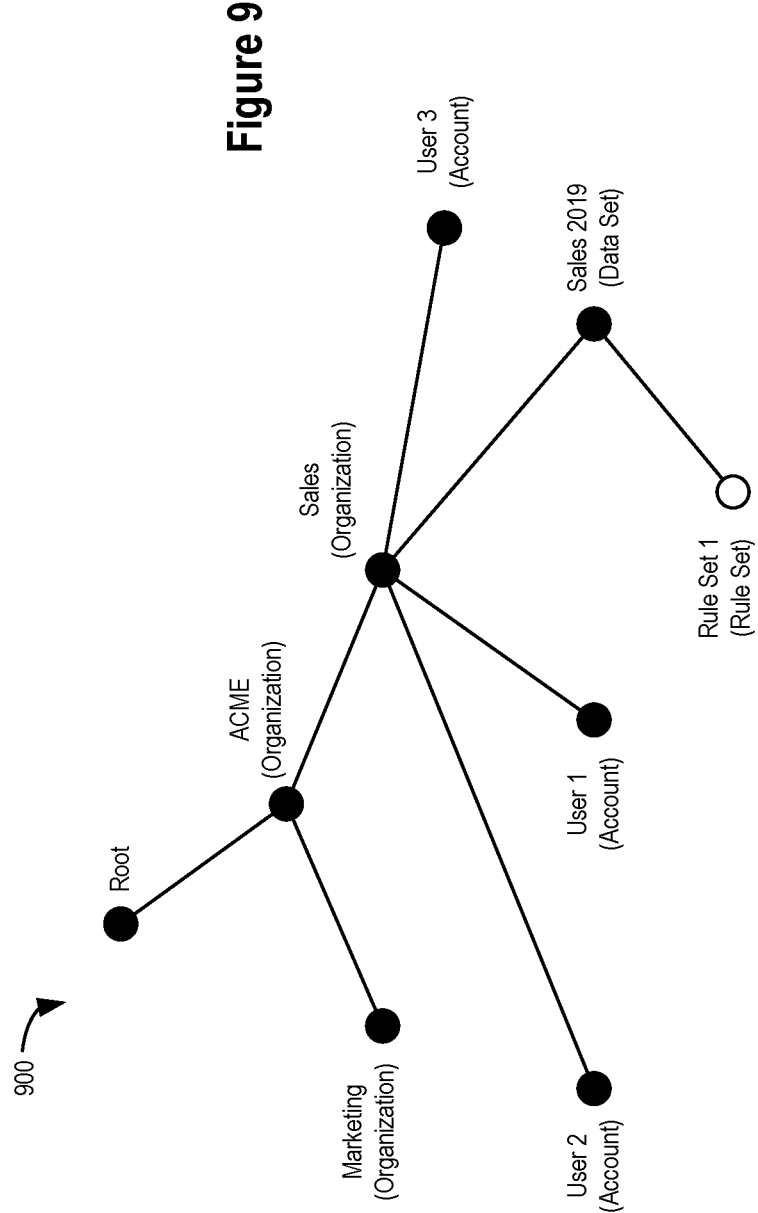
FIG. 9 illustrates an example of a directory tree including a top-level organization with two sub-level organizations and an associated rule set comprising three rules attached to a data set consistent with certain embodiments of the present disclosure.

FIG. 9 illustrates an example of a directory tree 900 including a top-level organization—ACME—with two sub-level organizations—Sales and Marketing—and an associated rule set 902—Rule Set 1—comprising three rules attached to a data set—Sales 2019—consistent with certain embodiments of the present disclosure. The first rule of Rule Set 1 may grant all members of the Sales organization (as the subject of the rule) the privilege to update data on the data set Sales 2019 (as the object of the rule). This may permit members of the Sales organization to change data in the data set. The next rule of Rule Set 1 may grant all members of the Sales organization the privilege to query data from the Sales 2019 data set. Finally, the third rule may grant the Marketing organization (including all members of the Marketing organization and any sub organizations) the privilege to query data from the Sales 2019 data set. In this manner, Rule Set 1 may grant rights to a data set owned by one organization—Sales—to members of a different organization—Marketing—that may not necessarily be a sub-organization of Sales and/or an account in Sales.

Figure 10:
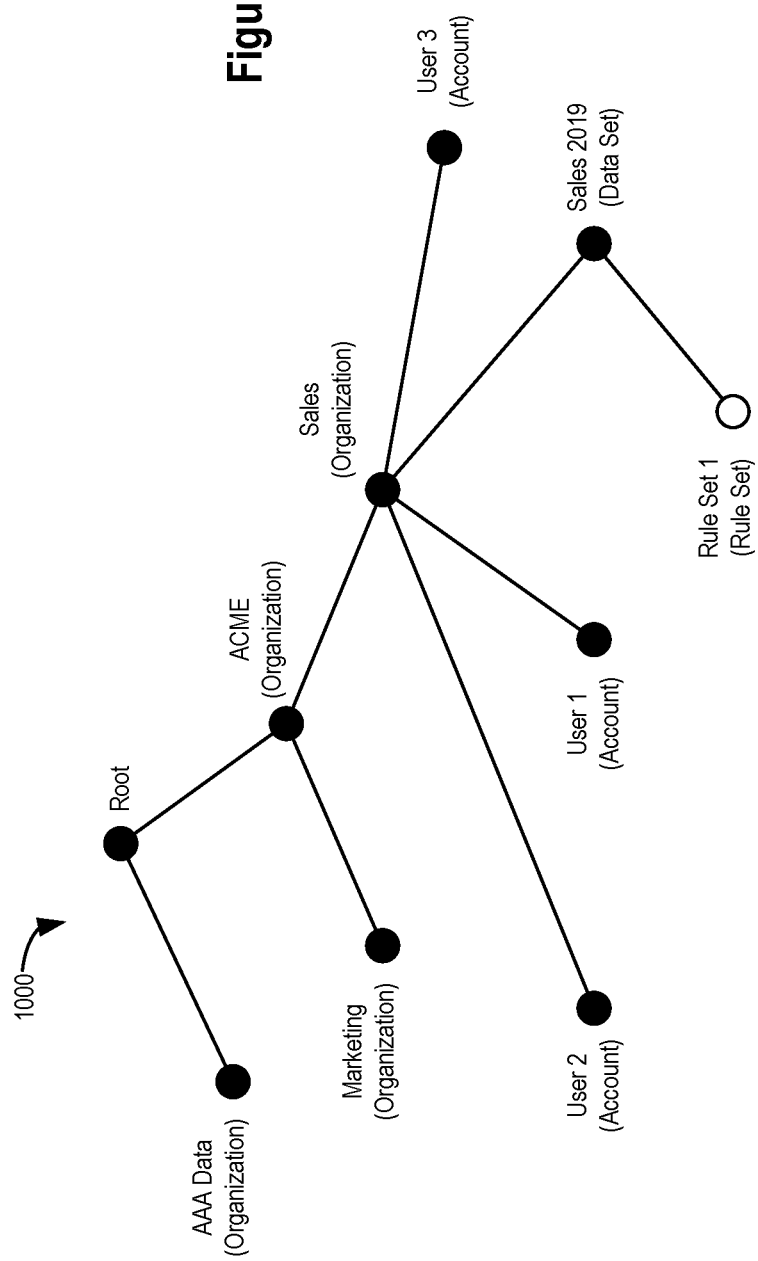
FIG. 10 illustrates an example of a directory tree including a top-level organization with two sub-level organizations and an associated rule set specifying a subject naming a separate top-level organization consistent with certain embodiments of the present disclosure.

FIG. 10 illustrates an example of a directory tree 1000 including a top-level organization—ACME—with two sub-level organizations—Sales and Marketing—and an associated rule set 1002—Rule Set 1—including a rule specifying a subject naming separate top-level organization—AAA Data—consistent with certain embodiments of the present disclosure. As shown, Rule Set 1 includes a rule specifying AAA Data as a subject having the privilege to query data of the object Sales 2019 data set. In this manner, one top-level organization—ACME—may specify a rule that allows sharing of data with another top-level organization—AAA Data.

Figure 11:
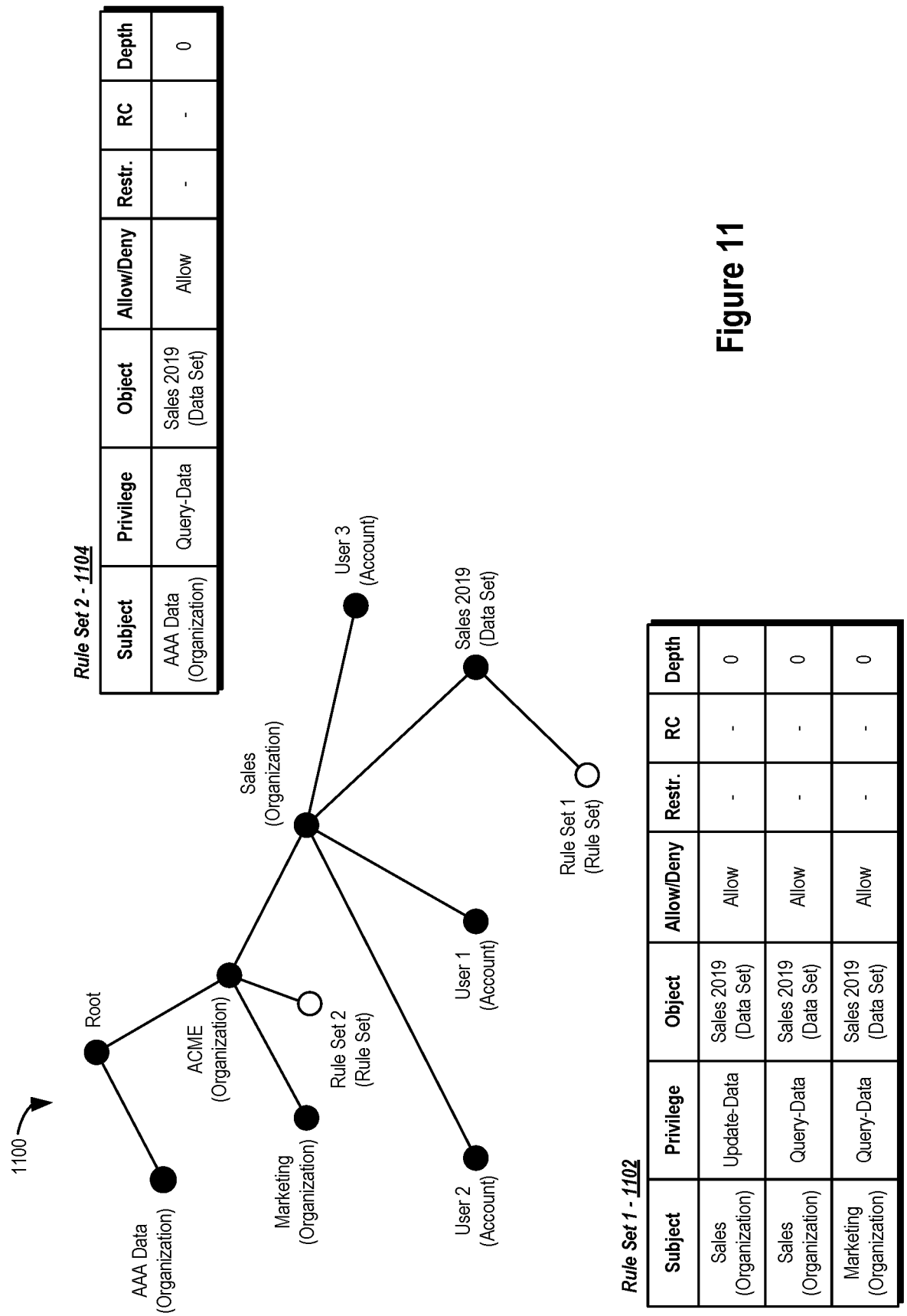
FIG. 11 illustrates an example of a directory tree including two top-level organizations with two sub-level organizations and a plurality of associated rule sets consistent with certain embodiments of the present disclosure.

FIG. 11 illustrates an example of a directory tree 1100 including a top-level organization—ACME—with two sub-level organizations—Sales and Marketing—and a plurality of associated rule sets 1102, 1104—Rule Set 1 and Rule Set 2—consistent with certain embodiments of the present disclosure. As shown a second rule set 1104—Rule Set 2—may be attached to the ACME organization. As Rule Set 2 is attached above the Sales organization in the directory tree 100, it will also apply to child accounts of the Sales organizations and/or any child data sets such as the Sales 2019 data set. Specifically, rules that are found in the path from an object to a root may apply to the object. In the illustrated directory tree 1100, the path from the Sales 2019 data set to the root may be as follows: Sales 2019→Sales→ACME Root.

Rule Set 1, which may be directly attached to the Sales 2019 data set, and Rule Set 2 may potentially both govern access to the Sales 2019 data set (if both rule sets 1102, 1102 name an object along the path from Sales 2019 up the root). Rule sets along an appropriate path from an object to the root may be prioritized so that objects closer to the root may take precedence (in the event rules conflict) over those lower in the directory tree 1100. Thus, in the illustrated directory tree 1100, Rule Set 2 may take precedence over Rule Set 1.

In the illustrated example, Rule Set 1 may grant, among other rights, a query data privilege to members of the Sales and Marketing organizations. Rule Set 2 may grant the query data privilege to members of the AAA Data organization. As the constituent rules of Rule Set 1 and Rule Set 2 do not conflict, the rules sets 1102, 1104 may be additive. Therefore, members of all three organizations—Sales, Marketing, and AAA Data—may have query data privileges on the Sales 2019 data set.

Figure 12:
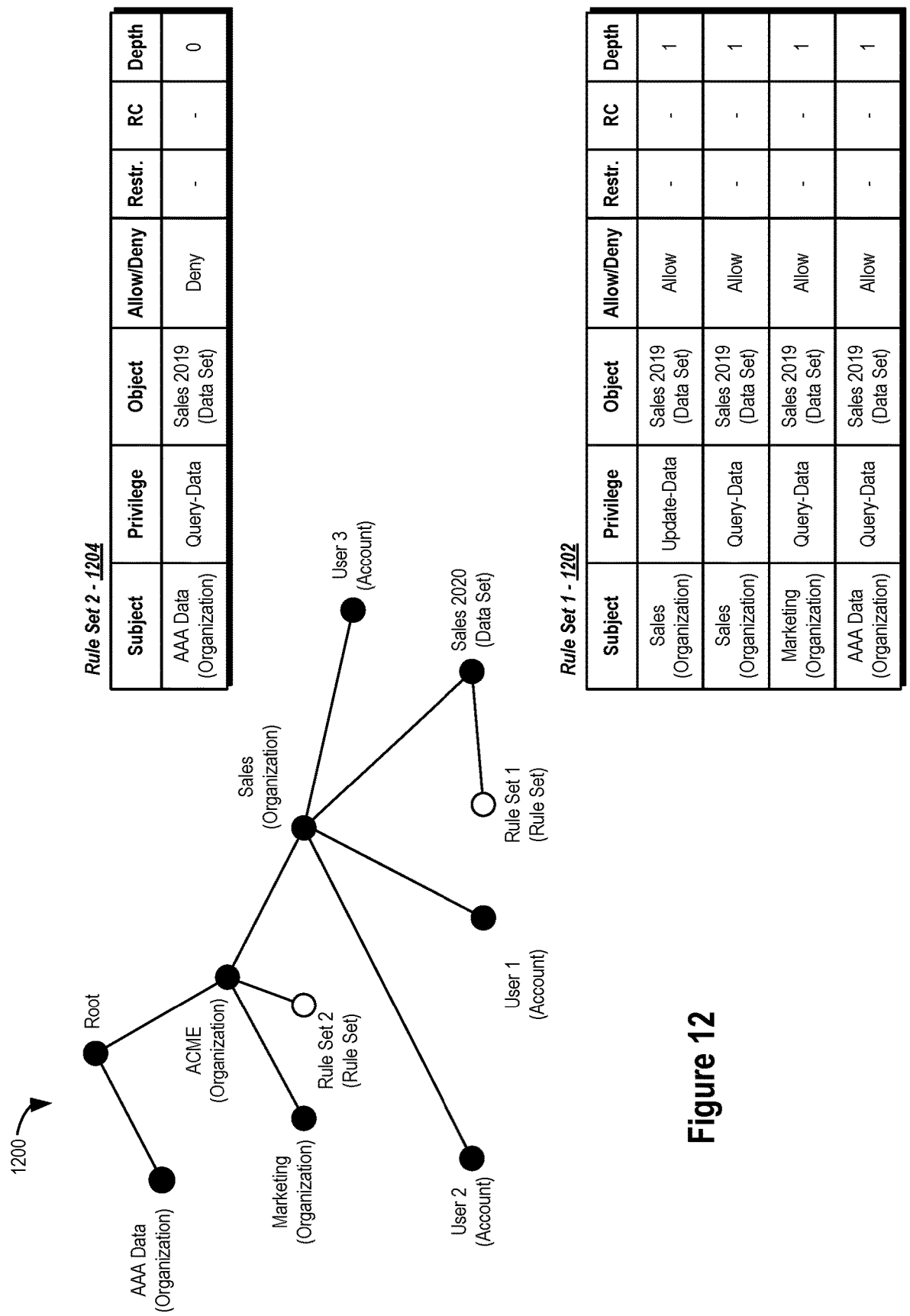
FIG. 12 illustrates an example of a directory tree including two top-level organizations with two sub-level organizations and a plurality of associated rule sets having different precedence consistent with certain embodiments of the present disclosure.

FIG. 12 illustrates an example of a directory tree 1200 including two a top-level organizations—ACME and AAA Data—with two sub-level organizations—Sales and Marketing—and a plurality of associated rule sets 1202, 1204—Rule Set 1 and Rule Set 2—having different precedence consistent with certain embodiments of the present disclosure. As shown, Rule Set 1, which may be attached to the Sales 2019 data set, may comprise rules granting data query privileges to the Sales 2019 data set to the Sales, Marketing, and AAA Data organizations (among other rules). Rule Set 2, which may attach to the ACME organization directly, however, may comprise a rule denying data query privileges to the Sales 2019 data set to the AAA Data organization. Since Rule Set 2 is of higher precedent (e.g., by virtue of being attached to an object higher in the directory tree), its conflicting rule may control data access determinations. Accordingly, members of the AAA data organization may be denied the ability to query data from the Sales 2019 data set. In this manner, a higher level and/or otherwise overriding rule may be applied to countermand a rule at a lower level in the organizational structure.

Figure 13:
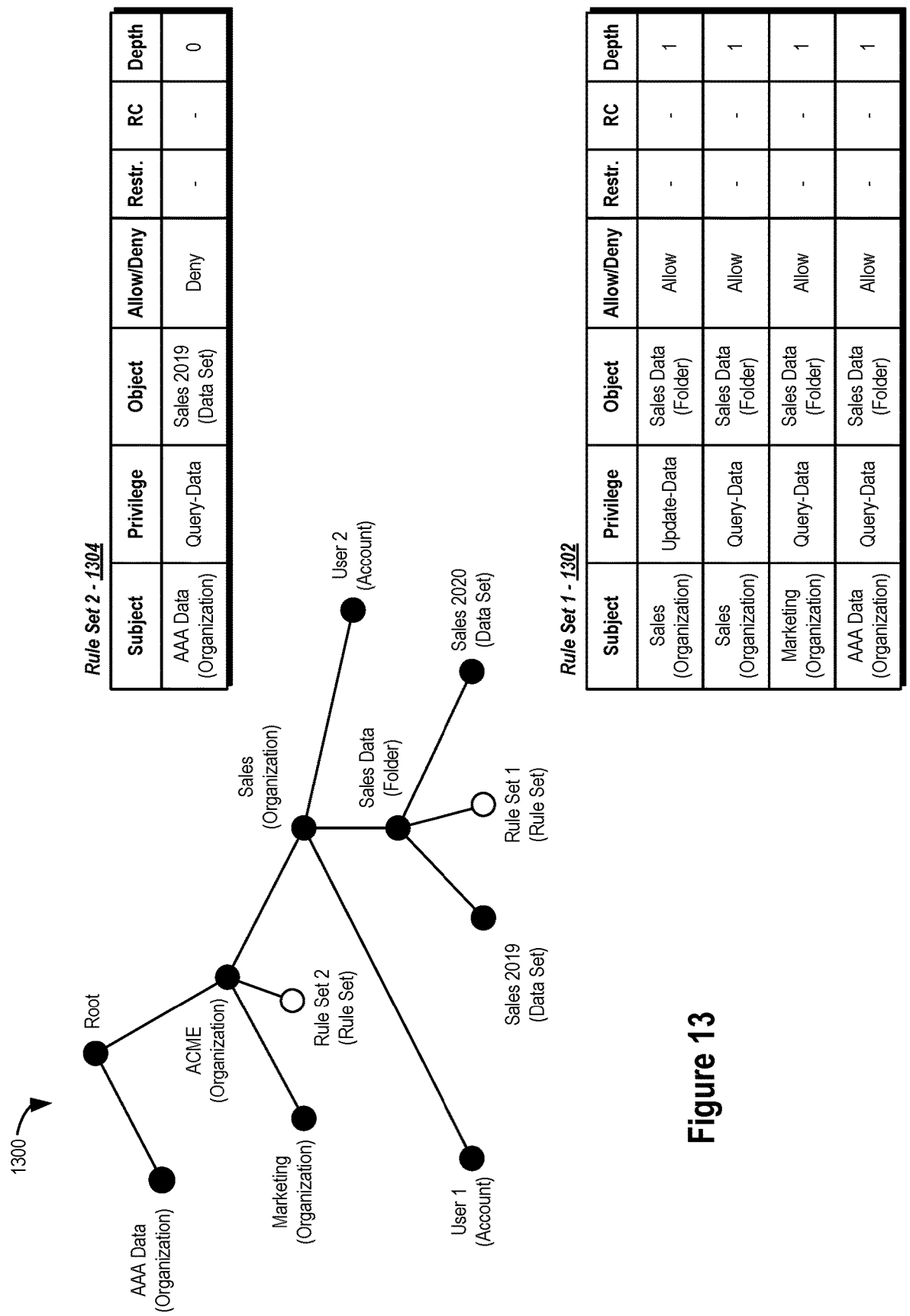
FIG. 13 illustrates an example of a directory tree including an object grouping construct using a folder consistent with certain embodiments of the present disclosure.

FIG. 13 illustrates an example of a directory tree 1300 including an object grouping construct using a folder—Sales Data—consistent with certain embodiments of the present disclosure. As shown, the Sales Data folder may be a child object of the Sales organization. The Sales Data folder may itself have two child objects: the Sales 2019 data set and the Sales 2020 data set. The child objects may have hard links to the parent folder Sales Data. As discussed herein, although not shown in connection with the objects included in directory tree 1300, folders may also be linked via soft links (e.g., non-owning and/or otherwise non-governing) to data sets.

A first rule set 1302—Rule Set 1—may be attached to the Sales Data folder. Accordingly, Rule Set 1 may potentially govern the Sales Data folder and any child objects and/or objects below this folder depending on the depth specified in the constituent rules of Rule Set 1. As shown, Rule Set 1 may specify the Sales Data folder as the object of its constituent rules. As the specified depth of the rules is 1, three other objects may be potentially governed by the rules of Rule Set 1: the Sales Data folder, the Sales 2019 data set, and the Sales 2020 data set. Although not shown, rules in Rule Set 1 could also potentially govern Rule Set 1 if privileges included in the constituent rules applied to the rule set.

A second rule set 1304—Rule Set 2, may attach to the ACME organization directly, and may comprise a rule denying data query privileges to the Sales 2019 data set to the AAA Data organization. Since Rule Set 2 is of higher precedence (e.g., by virtue of being attached to an object higher in the directory tree), its conflicting rule may control data access determinations. Accordingly, members of the Sales organization may have both update and query privileges to the Sales Data folder and the child data sets Sales 2019 and Sales 2020. The Marketing organization members may have query privileges to the same three objects. Members of the AAA data organization may be denied the ability to query data from the Sales 2019 data set, but they may still be allowed to query the Sales 2020 data set.

Figure 14:
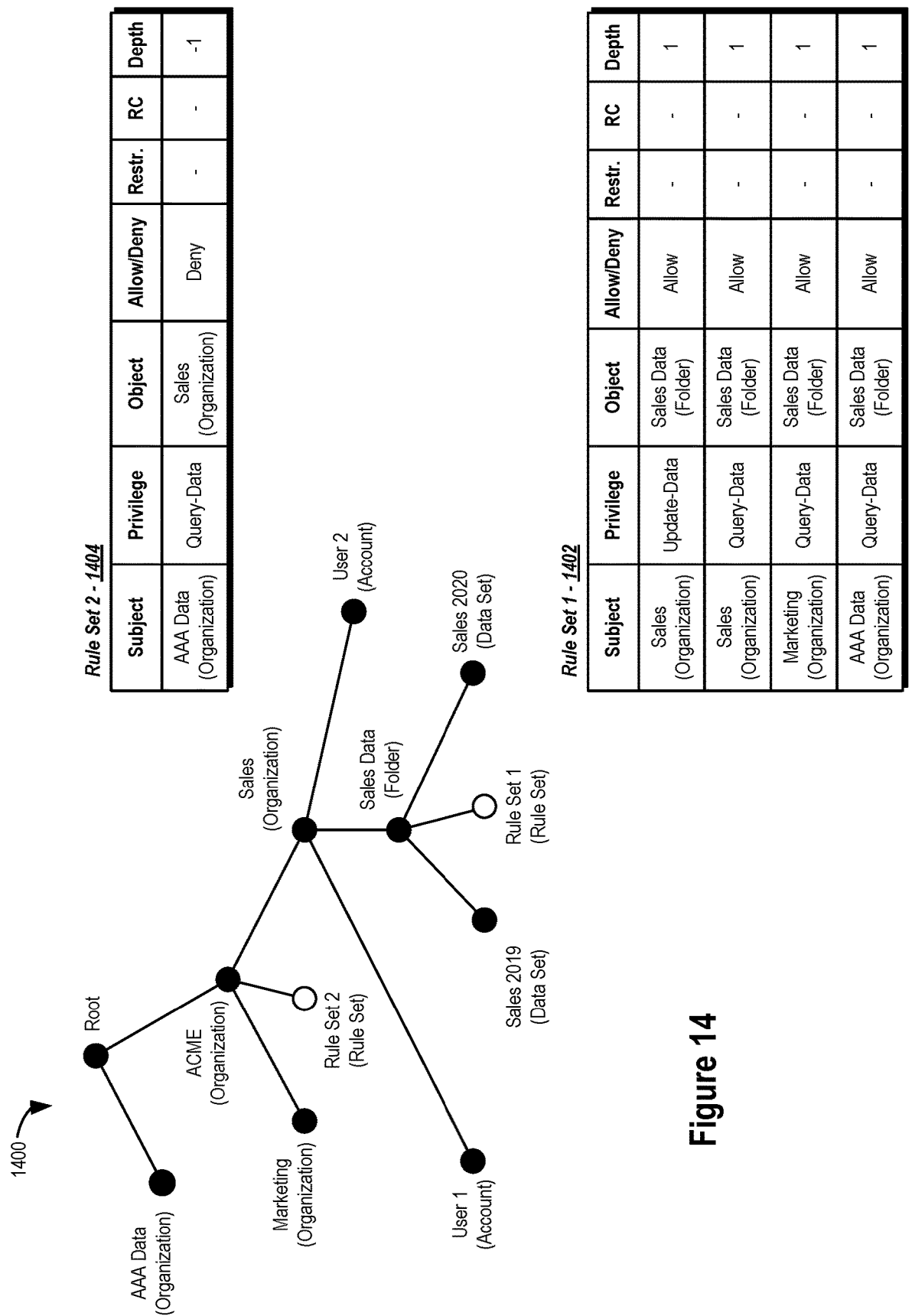
FIG. 14 illustrates another example of a directory tree including an object grouping construct using a folder consistent with certain embodiments of the present disclosure.

FIG. 14 illustrates another example of a directory tree 1400 including an object grouping construct using a folder—Sales Data—consistent with certain embodiments of the present disclosure. As shown, the Sales Data folder may be a child object of the Sales organization. The Sales Data folder may itself have two child objects: the Sales 2019 data set and the Sales 2020 data set.

A first rule set 1402—Rule Set 1—may be attached to the Sales Data folder. Accordingly, Rule Set 1 may potentially govern the Sales Data folder and any child objects and/or objects below this folder depending on the depth specified in the constituent rules of Rule Set 1. As shown, Rule Set 1 may specify the Sales Data folder as the object of its constituent rules. As the specified depth of the rules is 1, three objects may be potentially governed by the rules of Rule Set 1: the Sales Data folder, the Sales 2019 data set, and the Sales 2020 data set. Although not shown, rules in Rule Set 1 could also potentially govern Rule Set 1 if privileges included in the constituent rules applied to the rule set.

A second rule set 1404—Rule Set 2, may attach to the ACME organization directly, and may comprise a rule denying data query privileges to any objects below the Sales organization to the AAA Data organization with an associated depth of −1. That is, the object of the rule of Rule Set 2 may be the Sales Organization. In certain embodiments, a depth of −1 may be used to denote that the rule applies to child objects at any level below the associated object (i.e., regardless of the number of levels/tiers below the associated object within the tree). Since Rule Set 2 is of higher precedence (e.g., by virtue of being attached to an object higher in the directory tree), it's conflicting rule may control data access determinations relative to the Sales organization object and any child objects below the Sales organization object in the directory tree 1400. Accordingly, members of the AAA Data organization may be denied the ability to query data from the Sales organization and/or any associated child objects below the Sales organization, regardless of the lower precedence conflicting rule granting AAA Data query access in Rule Set 2.

Figure 15:
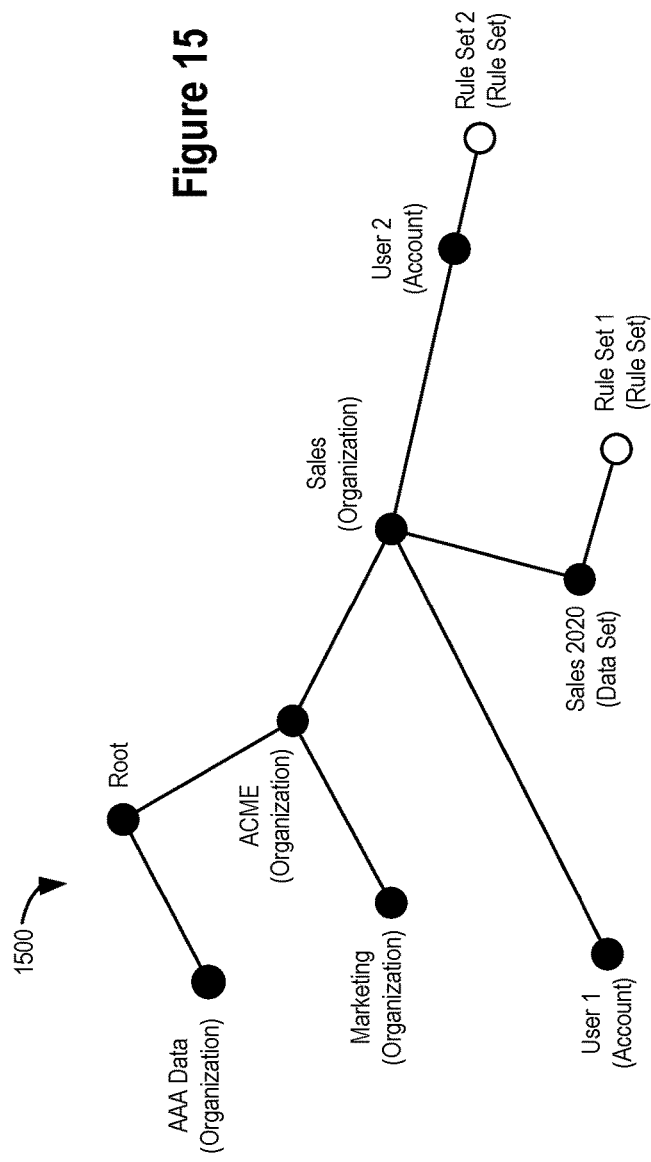
FIG. 15 illustrates an example of a directory tree where a user has attempted to grant themselves rights to a data set consistent with certain embodiments of the present disclosure.

FIG. 15 illustrates an example of a directory tree 1500 where a user has attempted to grant themselves rights to a data set consistent with certain embodiments of the present disclosure. As illustrated, a user account—User 2—may themselves generate a rule set 1504—Rule Set 2—granting them query privileges to a data set—Sales 2020. Specifically, User 2 may, in an attempt to gain access to the Sales 2020 data set, specify the Sales 2020 data set as an object in a rule with their own account as the subject. In certain embodiments, the ability to generate rule sets and attach a rule set to a user's own account may be reflected in a further rule granted to an object associated with the user's account.

Consistent with various aspects of the embodiments disclosed herein, because the rules in Rule Set 2 are not along the path from the Sales 2020 and the root, they may not have any effect in connection with access control determinations relative to the Sales 2020 data set. Therefore, User 2's attempt to grant themselves query access to the Sales 2020 data set will be ineffectual. Rule set 1502—Rule Set 1—attached directly to the Sales 2020 data set, however, will be applied in connection with access control determinations, which may result in User 1 being allowed query access to the Sales 2020 data set.

Figure 16:
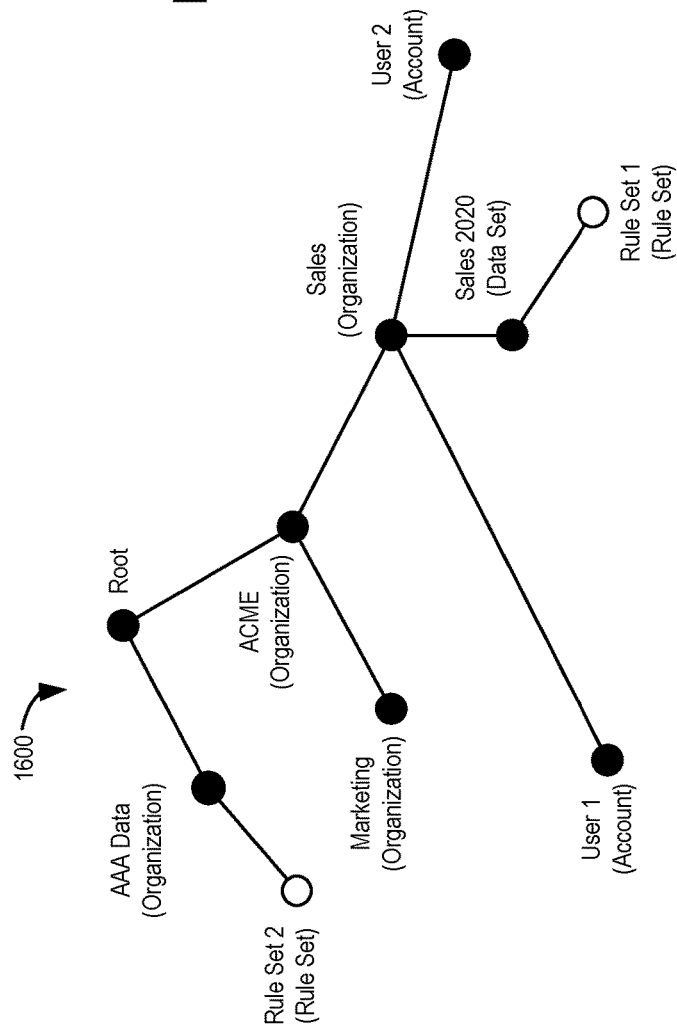
FIG. 16 illustrates an example of a directory tree where an organization has attempted to grant itself rights to a data set consistent with certain embodiments of the present disclosure.

FIG. 16 illustrates an example of a directory tree 1600 where an organization has attempted to grant itself rights to a data set consistent with certain embodiments of the present disclosure. As illustrated, an organization—AAA Data—may generate a rule set 1604—Rule Set 2—granting itself query privileges to a data set—Sales 2020. Specifically, the AAA Data organization, may, in an attempt to gain access to the Sales 2020 data set, specify the Sales 2020 data set as an object in a rule with the AAA Data organization as the subject.

Consistent with various aspects of the embodiments disclosed herein, because the rules in Rule Set 2 are not along the path from the Sales 2020 data set and the root, they may not have any effect in connection with access control determinations relative to the Sales 2020 data set. Therefore, the AAA Data organization's attempt to grant itself query access to the Sales 2020 data set will be ineffectual. Rule set 1602—Rule Set 1—attached directly to the Sales 2020 data set, however, will be applied in connection with access control determinations, which may result in User 1 being allowed query access to the Sales 2020 data set.

Figure 17:
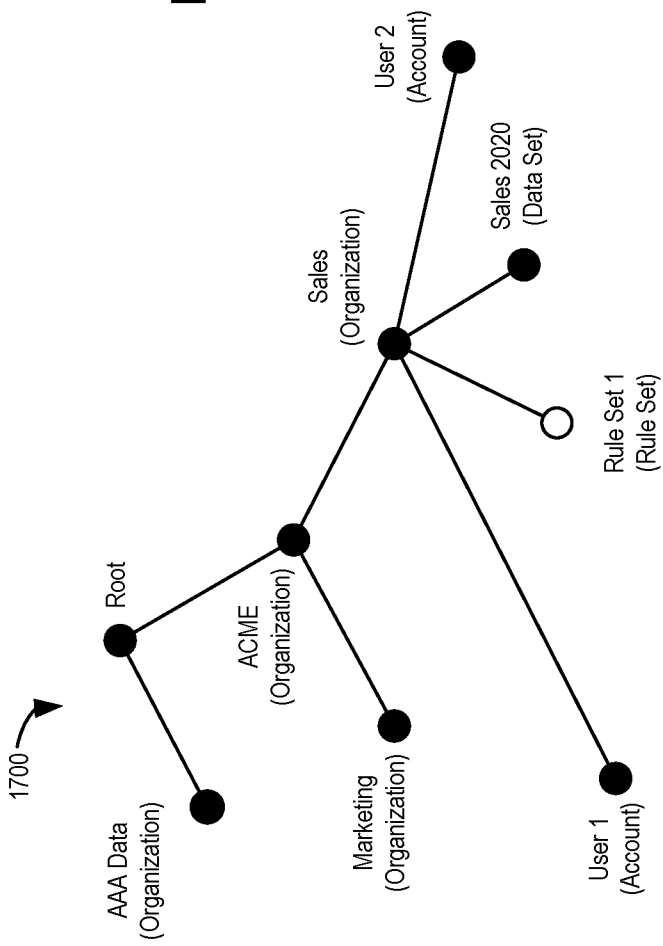
FIG. 17 illustrates an example of a directory tree including a rule set attached to a sub-organization from a top-level organization with the top-level organization as a rule object consistent with certain embodiments of the present disclosure.

FIG. 17 illustrates an example of a directory tree 1700 including a rule set 1702—Rule Set 1—attached to a sub-organization—Sales—below a top-level organization—ACME—with the top-level organization as a rule object consistent with certain embodiments of the present disclosure. As shown, the rules of Rule Set 1 specify objects above the attachment point of the rule set 1702, and thus the effective object of the rules is reduced from the organization to the Sales organization. Therefore, Rule Set 1 may grant User 1 view and modify privileges on the Sales organization, but not the ACME organization. Indeed, User 1 would be denied view and/or modify privileges on the ACME organization in connection with an associated access control decisions.

If it was intended to grant User 1 view and/or modify privileges to the ACME organization, Rule Set 1 would have needed to been attached to the ACME organization object (and/or attached to an object higher than the ACME organization object in the directory tree 1700). To do so, the actor establishing and/or attaching the rule would require the requisite rights. As detailed above, to attach governance on an object within a directory (e.g., directory tree 1700) consistent with various aspects of the disclosed embodiments, a caller may be required to have requisite privileges on the object (e.g., a sys:governance:add-child privilege). In this manner, the application of governance itself is a governed operation where actors may not insert rule sets into the directory unless they have the requisite privileges to do so.

Figure 18:
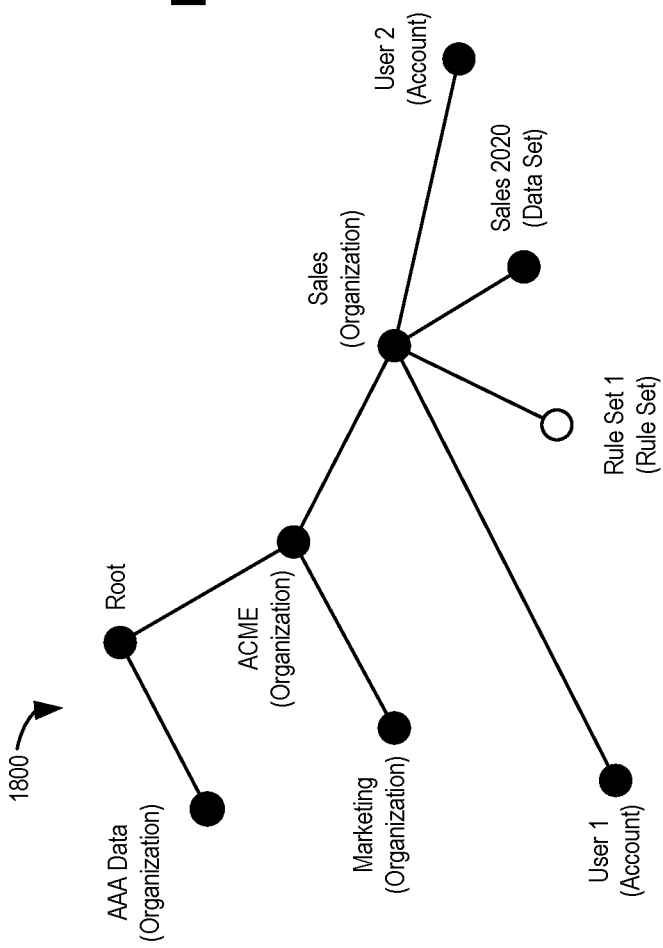
FIG. 18 illustrates an example of a directory tree including a rule set attached to a sub-organization consistent with certain embodiments of the present disclosure.

FIG. 18 illustrates an example of a directory tree 1800 including a rule set 1802—Rule Set 1—attached to a sub-organization —Sales—consistent with certain embodiments of the present disclosure. As illustrated, the rule set 1802 includes constituent rules naming the Sales organization as the object. The rules of Rule Set 1 may grant User 1 privileges to view and modify the Sales organization object. Because the depth of constituent rules is specified as 0, however, User 1 does not have any privileges with respect any child objects of the Sales organization. Accordingly, User one may not have any privileges with respect to the Sales 2020 data set or the account objects for User 1 or User 2.

Figure 19:
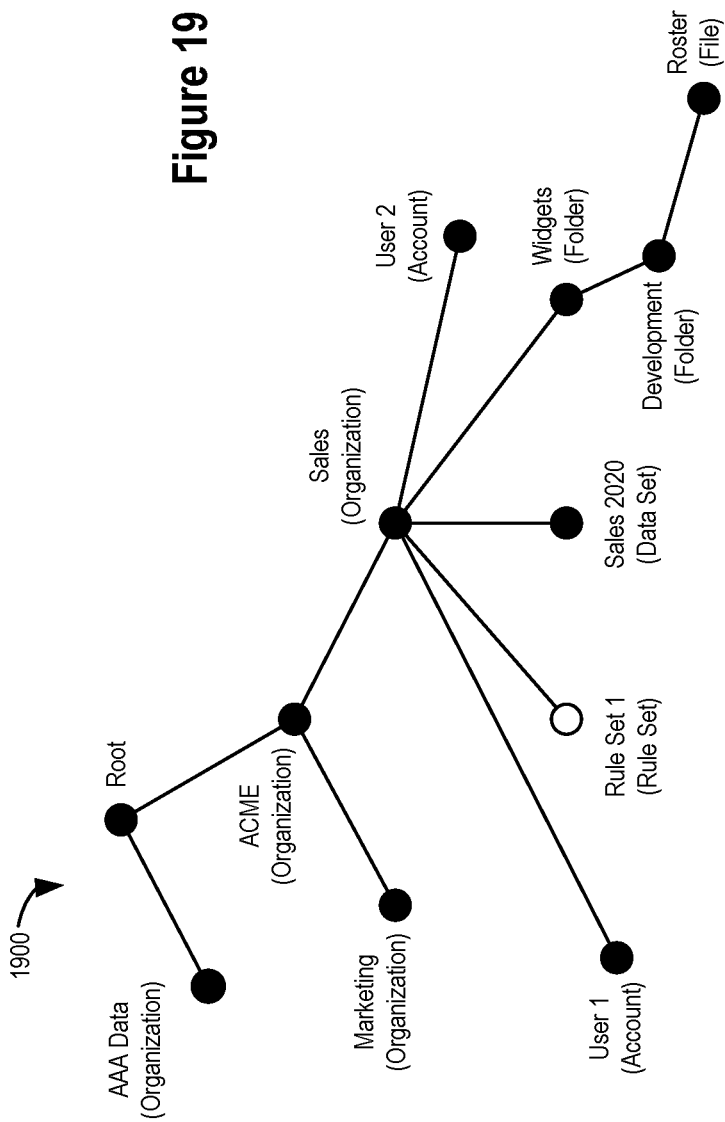
FIG. 19 illustrates an example of a directory tree including a rule set including rules with specified depth parameters attached to a sub-organization consistent with certain embodiments of the present disclosure.

FIG. 19 illustrates an example of a directory tree 1900 including a rule set 1902—Rule Set 1—including rules with specified depth parameters attached to a sub-organization—Sales—consistent with certain embodiments of the present disclosure. As shown, the Sales organization object has a number of child objects including a first folder object—Widgets—a second folder object below the first folder object—Development—and a file and/or data set below the second folder object—Roster. As Rule Set 1 is attached to the Sales organization, User 1 may be granted view and modify privileges on the Sales organization object and child objects to a depth of three. Accordingly, in connection with an access control determination, User 1 would have view and modify privileges on the Sales organization object, the Widgets folder object, the Development folder objects, and the Roster file object. User 1 would also have view and modify privileges on the User 1 account object, the User 2 account object, and the Sales 2020 data set object.

Figure 20:
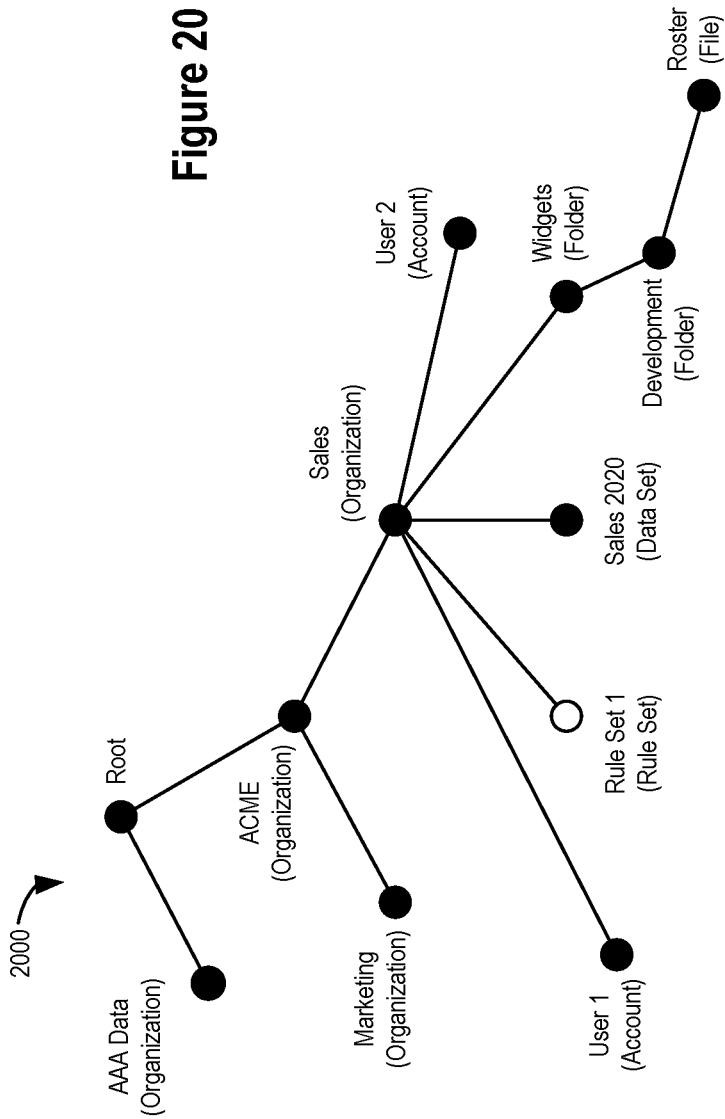
FIG. 20 illustrates an example of a directory tree including a rule set attached to a sub-organization with rules having a higher-level organization as an object consistent with certain embodiments of the present disclosure.

FIG. 20 illustrates an example of a directory tree 2000 including a rule set 2002 attached to a sub-organization—Sales—with rules having a higher-level organization as an object—ACME—consistent with certain embodiments of the present disclosure. As shown, the Sales organization object has a number of child objects including a first folder object—Widgets—a second folder object below the first folder object—Development—and a file and/or data set below the second folder object—Roster. In certain embodiments, because the effective object of the rules of Rule Set 1 is attached to a higher-level object, the effective object of the rules of the rule set 2002 may be narrowed to the Sales organization. The specified depth of the rules of 3 may be computed from the narrowed (i.e., the effective object) Sales. Therefore, in connection with an access control determination, User 1 would have view and modify privileges on the Sales organization object, the Widgets folder object, the Development folder objects, and the Roster file object. User 1 would also have view and modify privileges on the User 1 account object, the User 2 account object, and the Sales 2020 data set object.

Figure 21:
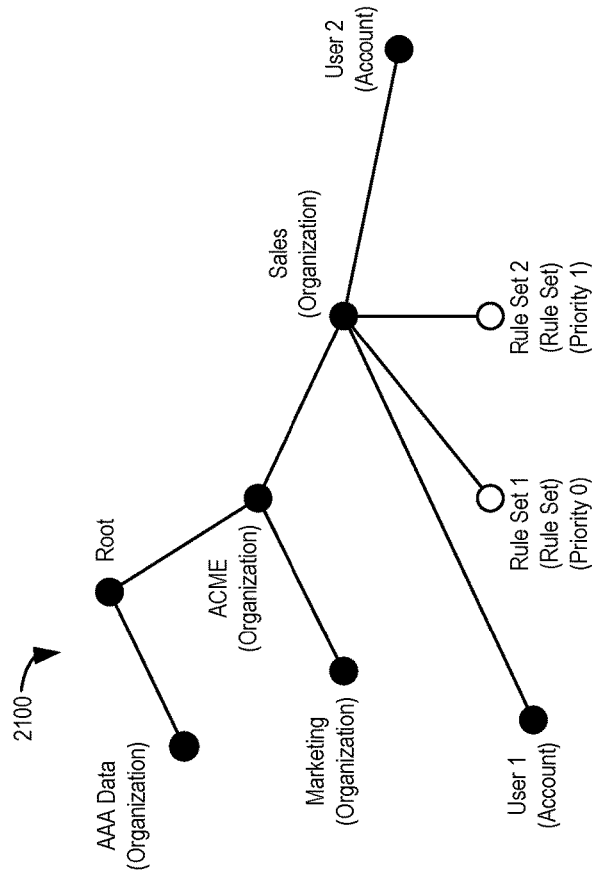
FIG. 21 illustrates an example of two rule sets attached to an organization object in a directory tree consistent with certain embodiments of the present disclosure.

FIG. 21 illustrates an example of two rule sets 2102, 2104—Rule Set 1 and Rule Set 2—attached to an organization object—Sales—in a directory tree 2100 consistent with certain embodiments of the present disclosure. Each rule set 2102, 2104 may have an associated and/or otherwise specified priority, which may establish the priority of the rule set among all rule sets attached to the same point in the directory tree 2100. For example, as shown, Rule Set 1 has priority 0 and Rule Set 2 has a priority 1, meaning that Rule Set 1 takes precedence over Rule Set 2 in connection with access control determinations.

In the illustrated example, the relative precedence between rule sets 2102, 2104 may not impact access control determinations as there are no conflicts among the constituent rules of rule sets 2102, 2104 and the rules all specify allowed privileges. Accordingly, rule sets 2102, 2104 may be additive, with both User 1 and User 2 being granted view and modify privileges on the Sales organization object (with the effective object in Rule Set 1 being narrowed to its attachment point).

Figure 22:
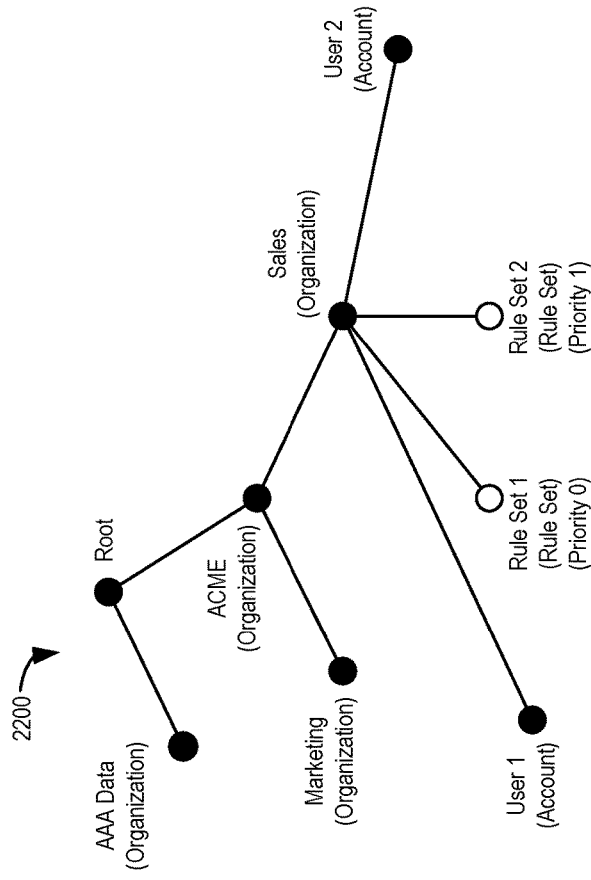
FIG. 22 illustrates another example of two rule sets attached to an organization object in a directory tree consistent with certain embodiments of the present disclosure.

FIG. 22 illustrates another example of two rule sets 2202, 2204—Rule Set 1 and Rule Set 2—attached to an organization—object—Sales in the directory tree 1102200 consistent with certain embodiments of the present disclosure. Each rule set 2202, 2204 may have an associated and/or otherwise specified priority, which may establish the priority of the rule set among all rule sets attached to the same point in the directory tree 1102200. For example, as shown, Rule Set 1 has priority 0 and Rule Set 2 has a priority 1, meaning that Rule Set 1 takes precedence ever Rule Set 2 in connection with access control determinations.

In the illustrated example, the constituent rules in Rule Set 1 are deny rules which deny view and modify privileges to User 2 on the Sales organization object. Although the constituent rules in Rule Set 2 are allow rules that allow view and modify privileges to User 2 on the Sales organization object, because of the relative priority, the rules in Rule Set 1 take precedence. Therefore, in connection with an access control determination, User 2 would not be allowed to view or modify the Sales organization object.

FIG. 23 illustrates an example of a directory tree 2300 with three rule sets 2302, 2304, 2306—Rule Set 1, Rule Set 2, and Rule Set 3—consistent with certain embodiments of the present disclosure. As shown, Rule Set 1 and Rule Set 2 may be attached to the Sales sub-organization, and Rule Set 3 may be attached to the ACME top-level organization. Rule Set 3, which may include a rule granting User 2 view privileges on the Sales organization object, may thus take precedence over the other two rule sets 2302, 2304 (e.g., overring a similar rule in Rule Set 2). Accordingly, in connection with an access control determination, User 2 would have view privileges on the Sales organization based on Rule Set 3, but not modify privileges because of Rule Set 1 denying this privilege. Rule Set 2 would not impact User 2 view and modify privileges in an access control determination as its constituent rules are superseded by Rule Set 1—due to a higher associated priority—and Rule Set 3—due to a higher precedence by virtue of its attachment point in the directory tree 2300.

Multiple Owning Entities

In various embodiments described herein, a governed object may have a single associated parent object in the directory tree. In some embodiments, this may simplify the ability to locate and/or order the priority of associated access control rules as a path from the governed object to the root of the directory may be determined with relative ease. Certain embodiments disclosed herein may be extended to cases where multiple owners may have interests in the governance of governed objects in, for example, an organization having multiple owners. Such circumstances may arise, for example and without limitation, in connection with a joint venture where two "owning" organizations control a third organization and/or in a multi-party investment situation where there may be multiple owners of the assets of an organization.

In some embodiments, the tree-based model may be extended to support a direct acyclic graph ("DAG") where any governed object may have multiple parent objects (e.g., organizations). In certain embodiments, the DAG may be configured such that cycles may not occur in the DAG and/or situations where cycles might otherwise introduce indefinite recursion on lookup operations may be prevented.

In various embodiments, multiple rules that may result from multiple orders may be ordered. For example and without limitation, in some embodiments, weights may be associated with parent-child links in a DAG that may be used to determine which rules take precedence over other rules. In situations where ambiguities may result from equal ownership and/or equal ownership weights, additional mechanisms may be used to determine rule precedence including, for example and without limitation, flagging parent-child links that may function as tie-breakers in cases where precedence would otherwise result in ambiguous interpretation of rule precedence.

Default Directory Rules

In various embodiments, rules attached closer to the root of a directory tree may lake precedence over rules attached to governed objects lower in the tree. In certain circumstances, however, different precedence rules may be employed. For example, different precedence rules may be employed in an environment where only parties that need to know certain information should be granted access to the information and/or where parties lower in a hierarchy can deny parties outside their organization (including above their parent organization in the hierarchy) access to protected information (e.g., as may be the case in protected information environments).

In some embodiments, organizations higher in an organization hierarchy and/or directory tree may establish default rides that may be overridden by rules lower in the hierarchy. Default rules may be designated accordingly, and a security service supporting such a designation may implement precedence rules to allow higher priority rules to come to attachments to objects closer to the govern object. In various embodiments, a top-level organization may set the policy that its rules may be overridden by those lower in the hierarchy, but once allowed, the access control rules can enforce the desired precedence.

Policies and Functions

As detailed above, various embodiments disclosed herein may use rules as foundational units of access control and/or one or more object-based directory trees in connection with implementing access control determinations. In further embodiments, policies, that may be implemented as functions, may be used in connection with access control determinations. In some instances, multiple policy functions may govern an object. In certain embodiments, polices may comprise programs that are evaluated based on parameters passed to the programs (e.g., actor, specified operation, specified object, etc.).

In certain embodiments, a graph database may be used with policies that may function similar to rules as described in connection with various embodiments disclosed herein. A directory service may manage the graph database and a security service, which may operate as and/or be referred to herein is certain instances as a policy management service, may perform various policy evaluation functions.

In various embodiments, policies may comprise objects that include a collection of one or more policy terms. A policy term may comprise a policy function and/or a restriction list. A policy function may comprise a program evaluated (during policy evaluation) to determine whether a policy term allows an actor to perform a specific governed operation on a specific governed object. In the policy function returns true, the corresponding restriction list may be returned. Otherwise, the next policy term may be examined. If all policy terms return false, the policy evaluation for the policy may return false and the operation may be denied.

Policies implemented as functions may use one or more restriction lists. Restriction lists may comprise a list of restrictions. A restriction list can be empty. In some embodiments, a restriction list may comprise a declarative description of the restrictions that may be imposed by a service managing a governed object (e.g., a "data access" or "data ingestion" service).

Consistent with various aspects of the disclosed embodiments, policies may be managed by a policy management service. Policies may be created via an API of the directory service and may be stored in a graph database. Before policies may be used, they may be bound to another object in the graph database. For example, if a policy is bound to an organization, it may become the default policy for the organization. If it is bound to a data set, it may become the specific policy for that data set. A policy may be associated with a name that defines the governed operation with which the policy is associated.

In certain embodiments, a policy may comprise policy terms and/or policy functions (which may be contained within the policy terms). A policy function may be defined to accept parameters, such as a specified actor and/or a governed object. Data management service components may invoke an policy management service API to check access rights to perform an operation and/or supply associated parameters. Data management service components may supply a user's access token as a surrogate for the actor vertex, and the policy management service may validate the access token with assistance from the authentication service. The directory service may determine (e.g., automatically determine) the actor vertex from the access token. The directory service service may also provide APIs to map external identifiers for objects, such as governed objects, to the internal governed object ID of the corresponding governed object vertex in the directory service graph database.

When the policy management service is invoked to perform a policy evaluation, it may locate applicable policies. In certain circumstances there may be many such policies, depending on organization structure and/or governing organizations within that structure. For example, a department (Department A) of a company (Company A) might both have policies governing the read operation on documents belonging to their respective organizational entities. It may be that Company A's policies override those of Department A's, or that Department A's and Company A's policies should both permit access before an operation is allowed.

Policy Evaluation

Consistent with certain embodiments disclosed herein, a data management system component wishing to check an actor's access to perform an operation on a governed object may invoke the policy management service, passing to the policy management service, few example, the access token of the actor, the ID of the governed object, and/or the ID of the governed operation. The policy management service may locate the set of applicable polices in the graph database and, in some embodiments, determine which of the policies is to act as a "policy combinator." This policy may be invoked, with a parameter list comprising parameters supplied by the caller, along with the list of other applicable policies.

In certain embodiments, the policy combinator policy may determine how to combine available policies. The policy combinator policy may, for example, implement an AND combination, where all applicable policies should grant access. Alternatively, the policy combinator can implement an OR combinator, where at least one policy should allow access. In some embodiments, richer combinators may also be implemented.

Depending on the policy combinator (if applicable), one or more policies may be evaluated, and an answer may be returned by the policy management service. The answer may comprise a Boolean true/false value and/or a list of restrictions (e.g., an empty list), although other answer formats may also be used. The service managing the governed object (e.g., an object access management service and/or the like) may enforce applicable restrictions.

In some embodiments, parameters to a policy may vary depending on the particular governed operation. For example, a read governed operation may be associated with one or more read policies. In some embodiments, the parameters for this policy may include the actor (e.g., specified by the actor's access token) and/or the ID of die governed object (e.g., a data set). The policy function may leverage edges and/or vertices in the policy graph as well as supplied parameters. For example, it may determine die actor's organization, application, client, and/or other objects by following appropriate edges in the policy graph.

In one example, a policy function may consider the question: Is the User a member of Organization 1? Consistent with embodiments disclosed herein, this can be answered by querying the policy graph to determine whether the vertex corresponding to Organization 1 is connected (e.g., connected by an edge) to the actor's vertex. Embodiments disclosed herein may allow for the checking of whether a user and/or actor is a direct member of an organization or a transitive member by way of sub-organizations.

Policy Graph Structure

Various embodiments using policies implemented as functions may use a policy graph database. In certain embodiments, policy vertices within the graph database may include, without limitation, one or more of actors, organizations, governed objects, and/or policies. Edges may represent the relationships between the various vertices.

A variety of edges may be used in connection with the disclosed embodiments, without limitation, one or more of:
  Is a member of—may record that an object associated with one vertex is a member of the object associated with the other vertex.
  Has created—may record the actor who has created a specific vertex (such as a governed object).
  Policies are owned by—may indicate the organization (e.g., in a tree of organizations) that has the combinator policy used during policy evaluation.
  Governed by read—may record the read policy associated with a vertex.
  Governed by ingest—may record the ingest policy associated with a vertex.
  Has—may record a has a relationship between two objects (e.g., vertices). For example, a has edge might connect User and Account vertices, signifying that the user has an account (e.g., an account in an organization).
  Defines—may record that a vertex object has defined another vertex object. For example, a defines edge might connect Organization and Group vertices, signifying that the organization has defined a Group.
  Owned by—may record the ownership of one object by another. For example, a Source may be owned by an Organization and a Data Set may be owned by an Organization.
  Acts as—may indicate a relationship between an Account and a Permission Set. For example, this edge may indicate that an Account can perform scoped operations in the permission set.

A user node may have a number of "is a member of" edges connecting the vertex to an organization vertex. In certain embodiments, a graph, which may not necessarily be a tree, may result linking users to organizations and organizations to organizations. Other relationships may also be represented by edges.

System Overview

Figure 24:
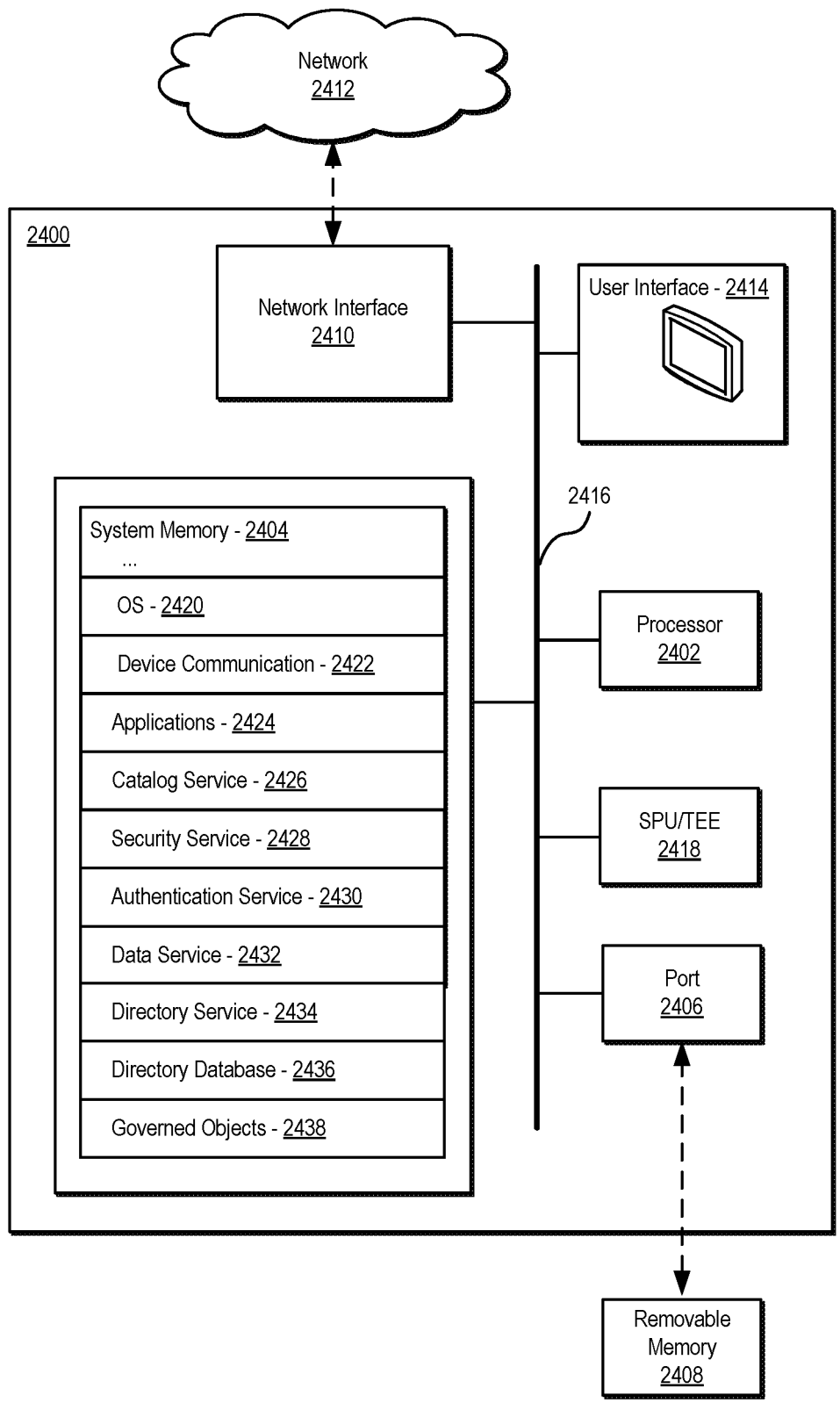
FIG. 24 illustrates an example of a system that may be used to implement certain embodiments of the systems and methods of the present disclosure.

FIG. 24 illustrates an example of a system 2400 that may be used to implement certain embodiments of the systems and methods of the present disclosure. Certain elements associated with the illustrated system 2400 may be included in a data management system, a client system, and/or any other system, device, and/or service configured to implement aspects of the embodiments of the systems and methods disclosed herein.

As illustrated in FIG. 24, the system 2400 may include: a processing unit 2402; system memory 2404, which may include high speed random access memory ("RAM"), non-volatile memory ("ROM"), and/or one or more bulk non-volatile non-transitory computer-readable storage mediums (e.g., a hard disk, flash memory, etc.) for storing programs and other data for use and execution by the processing unit; a port 2406 for interfacing with removable memory 2408 that may include one or more diskettes, optical storage mediums, and/or other non-transitory computer-readable storage mediums (e.g., flash memory, thumb drives, USB dongles, compact discs, DVDs, etc.); a network interface 2410 for communicating with other systems via one or more network connections 2412 using one or more communication technologies; a user interface 2414 that may include a display and/or one or more input/output devices such as, for example, a touchscreen, a keyboard, a mouse, a track pad, and the like; and one or more busses 2416 for communicatively coupling the elements of the system.

In some embodiments, the system 2400 may include a SPU and/or a TEE 2418 that is protected from tampering by a user of the system or other entities by utilizing secure physical and/or virtual security techniques. The SPU and/or TEE 2418 can help enhance the security of sensitive operations such user profile information management, access control determination and/or management, privacy and policy management, and other aspects of the systems and methods disclosed herein. In certain embodiments, the SPU and/or TEE 2418 may operate in a logically secure processing domain and be configured to protect and operate on secret information. In some embodiments, the SPU and/or TEE 2418 may include internal memory storing executable instructions or programs and/or other information configured to enable the SPU and/or TEE 2418 to perform secure operations.

The operation of the system may be generally controlled by the processing 2402 unit and/or the SPU and/or TEE 2418 by executing software instructions and programs stored in the system memory 2404 and/or internal memory of the SPU and/or TEE 2418 (and/or other computer-readable media, such as removable memory 2408). The system memory 2404 may store a variety of executable programs or modules for controlling the operation of the system. For example, the system memory 2404 may include an operating system ("OS") 2420 that may manage and coordinate, at least in pan, system hardware resources and provide for common services for execution of various applications.

The system memory 2404 may further include, without limitation, one or more of communication software 2422 configured to enable in part communication with and by the system 2400; one or more applications 2424; a catalog service 2426; a security service 2428; an authentication service 2430; a data service 2432; a directory service 2434; a directory database 2436; one or more governed objects 2438; and/or any other information, applications, and/or services configured to implement embodiments of the systems and methods disclosed herein and/or aspects thereof.

The systems and methods disclosed herein are not inherently related to any particular computer, device, service, or other apparatus and may be implemented by a suitable combination of hardware, software, and/or firmware. Software implementations may include one or more computer program comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, an optical storage medium, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein, but may be modified within the scope and equivalents of the appended claims.

What is claimed is:

1. A method for managing access to a governed object performed by a data management system comprising at least one processor and at least one non-transitory computer-readable medium storing instructions that, when executed by the at least one processor, cause the data management system to perform the method, the method comprising:
   receiving, by a data service of the data management system, an access token and a data access request from a client system, the data access request comprising an indication of a specified data set and an indication of an operation associated with at least one requested access privilege;
   validating the data access request by authenticating the access token;
   issuing, by the data service, an access control request to a security service of the data management system, the access control request comprising an indication of a subject associated with the access token, an indication of an object associated with the specified data set, and an indication of the at least one requested access privilege;
   identifying, by the security service, at least a first governed object in a directory database, the at least a first governed object corresponding with the indication of the object associated with the specified data set of the access control request;
   identifying, by the security service, at least a first rule set in the directory database, the at least a first rule set being associated with the at least a first governed object in the directory database, the at least a first rule set comprising at least a first rule specifying a depth associated with the at least a first rule, the at least a first rule set being attached to at least a second governed object located above the at least a first governed object in a root path of a directory tree in the directory database, the at least a second governed object being located above the at least a first governed object within the depth specified in the at least a first rule;
   identifying, by the security service, at least a first role in the directory database, the at least a first role being associated with the indication of the subject associated with the access token;
   determining, by the security service, based on the at least a first rule, the at least a first role, and the access control request, that the access control request should be granted, wherein determining that the access control request should be granted comprises:
      comparing the indication of the subject associated with the access token, the at least a first role, the indication of the object associated with the specified data set, and the indication of the at least one requested access privilege with the at least a first rule, and
      determining, based on the comparison, that the subject associated with the access token is permitted the at least one requested access privilege to the object associated with the specified data set;
   issuing, by the security service to the data service, an access control response granting access to the specified data set based on the determination; and
   permitting, by the data service, access to the specified data set by the client system in accordance with the access control response.

2. The method of claim 1, wherein authenticating the access token comprises invoking an authentication service of the data management system to validate the access token.

3. The method of claim 1, wherein authenticating the access token comprises invoking a remote authentication service to validate the access token.

4. The method of claim 1, wherein authenticating the access token comprises determining that the access token is not expired.

5. The method of claim 1, wherein the method further comprises:
   receiving, by an authentication service of the data management system from the client system, authentication credentials;

determining, by the authentication service, that the authentication credentials are associated with a valid account; and in response to determining that the authentication credentials are associated with a valid account, generating and transmitting the access token to the client system.

6. The method of claim 1, wherein the directory database is managed by a directory service of the data management system.

7. The method of claim 1, wherein the permitting access to the specified data set by the client system in accordance with the access control response comprises:

retrieving, by the data service, the specified data set from a data store; and transmitting, by the data service, a data access response to the client system based on the retrieved specified data set.

8. The method of claim 7, wherein the data store comprises a local data store of the data management system.

9. The method of claim 7, wherein the data store comprises a remote data store.

10. The method of claim 7, wherein the access control response comprises at least one restriction, and wherein retrieving the specified data set from the data store comprises retrieving the specified data set in accordance with the at least one restriction.

11. The method of claim 10, wherein retrieving the specified data set in accordance with the at least one restriction comprises transmitting at least one data retrieval request issued to the data store in accordance with the at least one restriction.

12. The method of claim 1, wherein identifying the at least a first rule set comprises determining that the at least a first rule set is attached to the at least a second governed object within the depth specified in at least the first rule in the root path of the directory tree in the directory database.

13. The method of claim 12, wherein the at least a second governed object comprises an object associated with an organization.

14. The method of claim 1, wherein the method further comprises:

identifying, by the security service, at least a second rule set in the directory database, the at least a second rule set being associated with the at least a first governed object in the directory database, the at least a second rule set comprising at least a second rule; and determining, by the security service, that the first rule set has a higher indicated priority than the second rule set.

15. The method of claim 1, wherein the subject associated with the access token comprises an account associated with the access token.

16. The method of claim 1, wherein permitting access to the specified data set by the client system further comprises:

locating the specified data set using a catalog service of the data management system.

17. The method of claim 1, wherein the method further comprises:

mapping the indication of the operation to the associated at least one requested access privilege.

\* \* \* \* \*